(12) United States Patent
Brady et al.

(10) Patent No.: US 6,463,430 B1
(45) Date of Patent: Oct. 8, 2002

(54) DEVICES AND METHODS FOR GENERATING AND MANAGING A DATABASE

(75) Inventors: Sean Brady; Chris Harris; Josh Dammeier; Sameer Samat, all of San Diego, CA (US)

(73) Assignee: Mohomine, Inc., San Diego, CA (US)

( * ) Notice: Subject to any disclaimer, the term of this patent is extended or adjusted under 35 U.S.C. 154(b) by 280 days.

(21) Appl. No.: 09/613,180

(22) Filed: Jul. 10, 2000

(51) Int. Cl.$^7$ .............................................. G06F 17/30
(52) U.S. Cl. ................................ 707/3; 707/6; 707/102
(58) Field of Search ............................... 707/3, 1, 2, 4, 707/5, 6, 7, 10, 102, 100, 104; 705/1

(56) References Cited

U.S. PATENT DOCUMENTS

| | | | |
|---|---|---|---|
| 5,933,822 A | 8/1999 | Braden-Harder et al. | 707/5 |
| 6,385,620 B1 * | 5/2002 | Kurzius et al. | 705/1 |

FOREIGN PATENT DOCUMENTS

| | | |
|---|---|---|
| WO | WO 00/26795 | 5/2000 |

OTHER PUBLICATIONS

Bowman et al., "Harvest: A Scalable, Customizable Discovery and Access System," Techncial Report CU–CS–732–94 Department of Computer Science University of Colorado, Mar. (1995).

(List continued on next page.)

*Primary Examiner*—Sanjiv Shah
(74) *Attorney, Agent, or Firm*—Morrison & Foerster LLP

(57) ABSTRACT

An automated method of creating or updating a database of resumes and related documents, the method comprising, a) entering at least one example document that is relevant to a subject taxonomy in a retrieval priority list, if there is a plurality of example documents stored in the retrieval priority list, ranking the example documents according to the relevancy of the example documents to the subject taxonomy;

b) retrieving a document from a network of documents, where the document is the most relevant document to the subject taxonomy stored in the retrieval priority list;

c) harvesting information from specified fields of the document;

d) classifying the information into one or more classes according to specified categories of the subject taxonomy;

e) storing the information into a database;

f) determining whether the information are links to other documents;

g) ranking the link's according to relevancy to the subject taxonomy, and storing the links in the retrieval priority list according to the relevancy;

h) terminating the method, provided the method's stop criteria have been met; and i) repeating steps b) through h), provided the method's stop criteria has not been met.

10 Claims, 15 Drawing Sheets

OTHER PUBLICATIONS

Chakrabarti et al., "Focused Crawling: A New Approach to Topic–Specific Web Resource Discovery," Mar. 29, 1999, (visited Dec. 6, 2000) <http://www.iwaps.com/InterLab99/crawling.html>.

Cho et al., "Efficient Crawling Through URL Ordering," 30:(1–7) Apr. 1, 1998, (visited Dec. 6, 2000) <http://www7.scu.edu.au/programme/fullpapers/1919/com1919.htm>.

Craven et al., "Learning to Extract Symbolic Knowledge from the World Wide Web," Proceedings of 15th National Conference on Artificial Intelligence (AAAI–98), <www.aaai.org.com>.

Grobelnick et al., "Efficient text categorizing," Proceedings of Text Mining Workshop on ECML–98 Chemnitzer infor matik–berichte 0947–5125, pp. 1–10 (1998) (visited Dec. 6, 2000) <http://www.cs.cmu.edu/afs/cs/projecttheo–4/text–learning/www/pww/>.

McCallum et al., "A Machine Learning Approach to Building Domain–Specific Search Engines" Sixteenth International Joint Conference on Artificial Intelligence (IJCAI–99), 1999 (visited Dec. 19, 2000) <http://www.ri.cmu.edu/pubs/pub_2715_text.html>.

McCallum et al., "Building Domain–Specific Search Engines with Machine Learning Techniques" AAAI Spring Symposium on Intelligent Agents in Cyberspace 1999, 1999 (visited Dec. 19, 2000) <http://www.ri.cmu.edu/pubs/pub_2716_text.html>.

* cited by examiner

DEVICES AND METHODS FOR GENERATING AND MANAGING A DATABASE

FIELD OF THE INVENTION

This invention relates generally to computer network data operations and, more particularly, to an apparatus for generating and updating databases for the retrieval of information.

BACKGROUND OF THE INVENTION

The Internet is a vast collection of documents that is accessible to the greatest number of users in the world. The Internet is constantly in flux, as new documents are added, and older documents are removed. The documents are typically written in hypertext mark-up language (HTML) and can include a mixture of text, graphic, audio and video elements. These documents comprise what is referred to as the "World Wide Web" and are also called web pages. Internet users can utilize a wide variety of Internet search engines that can be accessed with web browsers to locate and retrieve web pages that provide useful information. A user provides a search query, usually a string of words on a topic of interest, to a search engine, which then applies the search query to a database of web pages. Links to matching pages are returned to the user, typically ranked accordingly to a similarity score. Some of the currently popular search engines include "Alta Vista™", "Lycos™", "Yahoo™", "Google™" and "Infoseek™".

The database searched by each search engine is usually a proprietary database, created by the search engine operator. Often, the search engine database comprises a reverse-lookup table of individual words with links to the web documents in which they are found. A web page that contains multiple instances of the words in a search query has a higher similarity score than a web page that contains fewer words from the search query. Likewise, a web page that contains all the words from a search query will have a higher similarity score than a page that does not contain all the words from the search query. Although this type of matching will generally lead to valid results, such search techniques can locate a fair amount of duplicate and irrelevant documents.

Most search engines rely on programs called "crawlers" or "spiders" that search the Internet for new documents that are made accessible to Internet users by storage at a web server computer. The contents of such documents are read for their word content, and links to these documents (their Internet addresses) are automatically added to the reverse look-up database of the search engine. Alternatively, humans can review the documents and make a determination of categories into which the documents should be indexed. The search engine database is then modified to include the reviewed documents, so that links are inserted into the database according to the categories decided upon. In this way, the respective search engines include virtually all of the documents that may be found on the web.

Users can then access the search engine and provide a query. The search engine applies the query against the database and returns matches to the user. Unfortunately, the search results can easily become over-inclusive and return irrelevant links. For example, a search for information on North American wildlife may return links to discussions of stock market "bulls" and "bears". A search for Java™ programming developments may return links to coffee houses. This type of over-inclusion requires reviewing the search results and discarding the links that are identified as irrelevant, which can be a very inefficient use of time. As the number of links to the web increases, an over-inclusive search can result in inadvertent obfuscation rather than elucidation of the sought after relevant information.

One way to increase the relevancy of Internet documents located by a search engine is to limit the breadth of the search that is conducted. For example, a search may be limited to web pages found at a particular web site or Internet domain name. This technique works well if one is searching only for a web page at a particular site. The technique is not particularly useful if a more generalized subject matter search is desired, as the search will then be under-inclusive and many relevant documents will be missed.

Aside from being an ever growing repository for information, the Internet environment, and the World Wide Web, in particular, has become a nexus for commercial activity. A key factor for commercial success in the Internet environment is the ability of a web site to attract the web surfer. Recent trends and activity have seen development of a business strategy based on Vertical Portals. A Vertical Portal or "vortal" is a web site that is focused to a specific topic or several topics. The commercial advantage of such a site is that it provides the web advertiser with a narrow and well defined audience to which it can present its products and/or services. The commercial success of vortals, such as, ZDNet™ and eTrade™, have demonstrated the viability of this strategy. One of features that attract the defined audience to continually return to a vortal is often the accessibility of a database that focused on a specific area of interest. Vortals are increasingly receiving more traffic and repeat traffic, demonstrating that users are indeed in search of better, more relevant information. Further indication of the success of vortals is their ability to attract and charge higher. advertising rates, due to their well-defined audience. New vertical portals are projected to launch in vast number in the future.

From the discussion above, it should be apparent that there is a need for a database search technique that will provide relevant search results without unduly limiting the scope of the search. In addition, with the increasing number of vortals and commercial enterprises on the web there is a continuing need for an efficient method of generating and managing online databases. The present invention fulfills these needs and others.

SUMMARY OF THE INVENTION

An automated method of creating or updating a database of resumes and related documents, the method comprising,
- a) entering at least one example document that is relevant to a subject taxonomy in a retrieval priority list, if there is a plurality of example documents stored in the retrieval priority list, ranking the example documents according to the relevancy of the example documents to the subject taxonomy;
- b) retrieving a document from a network of documents, where the document is the most relevant document to the subject taxonomy stored in the retrieval priority list;
- c) harvesting information from specified fields of the document;
- d) classifying the information into one or more classes according to specified categories of the subject taxonomy;
- e) storing the information into a database;

f) determining whether the information are links to other documents;

g) ranking the link's according to relevancy to the subject taxonomy, and storing the links in the retrieval priority list according to the relevancy;

h) terminating the method, provided the method's stop criteria have been met; and i) repeating steps b) through h), provided the method's stop criteria has not been met.

DETAILED DESCRIPTION

Terms and Definitions

Figure 1:
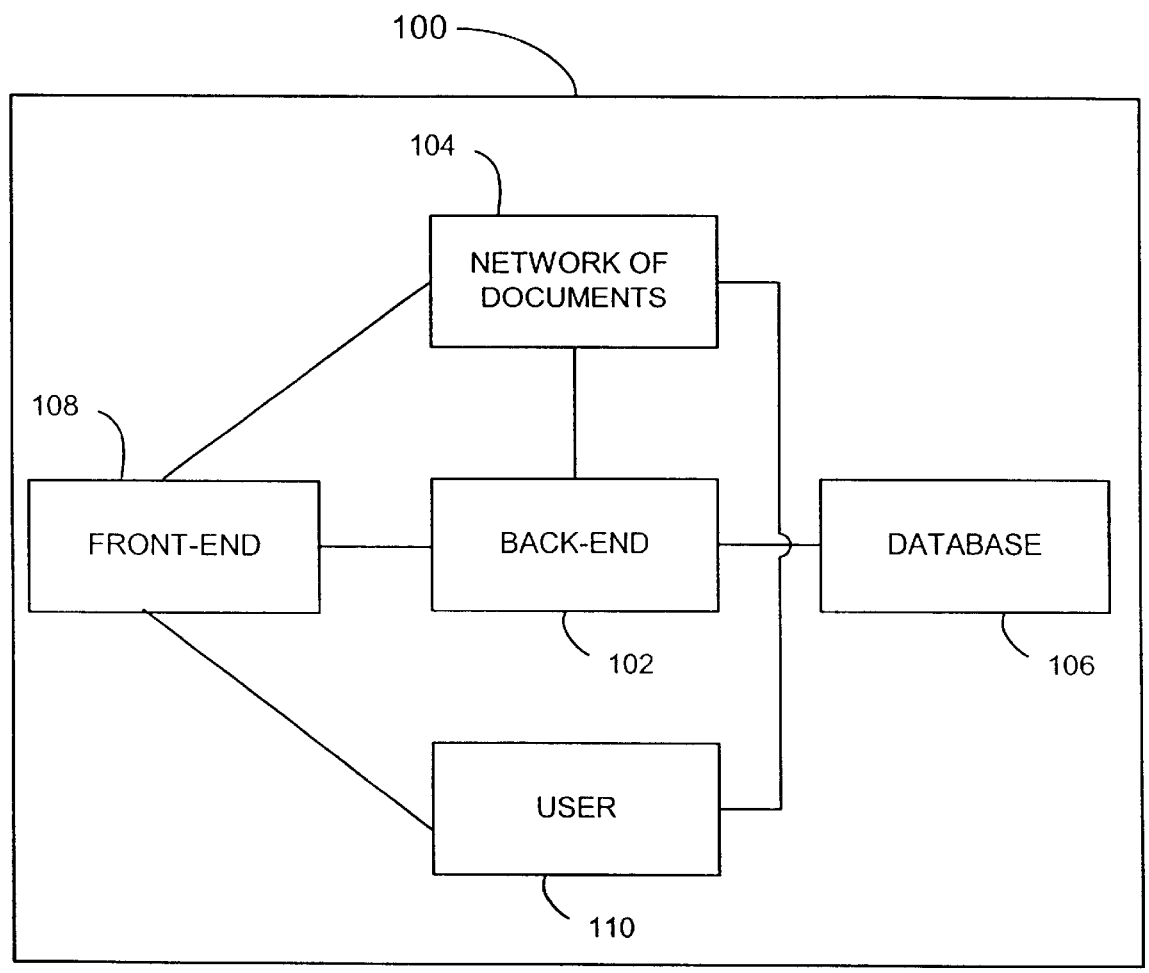
FIG. 1 is a block diagram of a computer network, such as the Internet, over which documents are processed to create a database that can be searched to identify relevant documents.

As used herein the term, "network of documents" refers to a body or collection of documents, such as, the Internet, the World Wide Web, local area networks (LANs), intranets, and the like.

As used herein the term, "documents" refers to information that is accessible from a network of documents, such as, web pages, web documents, and the like. Those of ordinary skill would be familiar with the above types of documents, and appreciate the applicability of the present invention to other like documents.

As used herein the terms, "information", "links", or "resource links" refers to data contained in documents. For example, data include but are not limited to the following forms, data maybe textual found in various formats, such as, ASCII text, HTML ("links"), XML or the like. The data may also be in the form of a graphics file found in various graphic file formats, such as, JPG, BMP, TIF or the like; or the data may also be in the form of a multimedia file, such as, AVI, MPEG, MOV or the like; or the data may also be in the form of an audio file, such as, WAV, MP3 or the like. Those of ordinary skill would be familiar with the above types of data, and appreciate the applicability of the present invention to other like forms of data.

As used herein the terms "spider" or "crawler" refers to a sequence of computer commands in the form of a computer program, subroutine or the like, that locate and retrieve documents according to specified criteria from a network of documents, such as, the Internet, the World Wide Web, LANs, intranets, or the like.

As used herein the term "harvester" refers to a sequence of computer commands in the form of a computer program, subroutine or the like, that extracts information from a document. The information is extracted from pre-specified fields in the document.

As used herein the term "Harvester Content Type Model" refers to a model that directs the Harvester as to the fields in a type of document to extract. Harvester Content Type Models are developed by an automated machine learning routine based on training sets of documents that exemplify the type of document that is to be harvested. For example, a Harvester Content Type Model for harvesting information from resumes could direct the Harvester to locate and extract information from the fields in the document corresponding to the name of the individual, the address, educational background, and commercial background.

As used herein the term "classifier" refers to a sequence of computer instructions in the form of a computer program, subroutine or the like, that classifies information according to a specified taxonomy.

As used herein the term "Classifier Content Type Model" means that provides the classifier with a model taxonomy from which extracted information is automatically assembler into a taxonomy. The extracted information can be automatically assigned into a database, or alternatively may be reviewed prior to assignment. For example, a Classifier Content Type Model for classifying extracted information from resumes could determine the appropriate category to store certain information, such as, whether the information is related to academic background, work experience, or personal information.

As used herein the term "Directed Graph Cluster Module" refers to a sequence of computer instructions in the form of a computer program, subroutine or the like, that determine relevancy of a link to a specific topic according to the number of other links related to said specific topic that referred to it. For example, typically a link that has a greater number of links linked to it that are also relevant to said subject topic, is construed to be of high relevance to the subject topic.

As used herein the term "subject taxonomy" means to a subject area for which information is gathered and categorized.

As used herein the term "example document" or "example documents" refer to documents provided as examples of the type of information that is being sought. Typically, example documents are used to aid the Harvester in selecting the most relevant Harvester Content Type Model, and the Classifier in selecting the most relevant Classifier Content Type Model.

As used herein the term "Retrieval Priority List" refers to repository of hypertext links, URL addresses, or the like, used in retrieving documents from a network of documents, such as, the Internet, World Wide Web, LANs, intranets, or the like. In the present invention, the contents of the Retrieval Priority List are ranked according to their relevance to a subject taxonomy. After each retrieved document is harvested and classified, information from the document that is identified as links are added to the Retrieval Priority List according to their relevance to the subject taxonomy. In this way, the Retrieval Priority List is dynamic, it is always directing the Spider to retrieve the most relevant document identified by the process at any given moment. For example in the instance where the spider is retrieving publicly available resumes and publications from the web, a retrieved resume may provide a link to a publication directed to subject matter that is relevant to the position that is to be filled. Evaluation of the publication may show that the potential co-authors are equally or more desirable candidates, in which case the resumes for these individuals may also be sought from the Internet.

As used herein the term "stop criteria" refers to any single or set of conditions, which would single the termination of the method of the present invention. Typical stop criteria, include but are not limited to the following conditions, the method having retrieved, harvested and classified a certain number of documents, the method having runs for a specified amount of time, the method having retrieved a specified number of documents at a specified level of relevancy to a subject taxonomy.

As used herein the term "resume" or "curriculum vitae" refers to a document that contains typically, information relevant to an individual's work and/or educational experience. Such documents are typically used to outline an individual's qualifications for a position. Within the context of this term, the term "and related documents" refers to documents that provide additional information regarding an individuals qualifications and expertise in a particular area, e.g., journal articles, or publications.

The present invention provides an automated method and device for creating, updating, accessing and managing databases. An embodiment of the present invention provides an automated method of creating or updating a database the method comprising, a) entering at least one example document that is relevant to a subject taxonomy in a retrieval priority list, if there is a plurality of example documents stored in said retrieval priority list, ranking said example documents according to the relevancy of said example documents to said subject taxonomy;

b) retrieving a document from a network of documents, where said document is the most relevant document to said subject taxonomy stored in said retrieval priority list;

c) harvesting information from specified fields of said document;

d) classifying said information into one or more classes according to specified categories of said subject taxonomy;

e) storing said information into a database;

f) determining whether said information are links to other documents;

g) ranking said link's according to relevancy to said subject taxonomy, and storing said links in said retrieval priority list according to said relevancy;

h) terminating said method, provided said method's stop criteria have been met; and i) repeating steps b) through h), provided said method's stop criteria has not been met.

One particular aspect of this embodiment is where said method is used to create or update a database of publicly available resumes retrieved from a network of documents. For example, said example documents are resumes of individuals with one or more desired attributes, such as, technical expertise, years of work experience in an industry, academic training (type of degree, institution where degree awarded, grade point average, etc.). Such a database is particularly advantageous to any individual or entity that desires to identify individuals who have posted their resumes on a network of documents with specific attributes, such as, a particular technical expertise, or employment experience, as possible employment candidates. In addition, the present invention also provides a method of entering into the database resumes that are directly submitted to the user.

Another aspect of the present invention is to include in the database documents, such as publications, articles and the like, relating to certain resumes that are relevant to a desired attribute. This is especially beneficial because it provides the user with additional information about a candidate prior to contacting the potential candidate.

Prior to the present invention, creating and updating a database of resumes was particularly labor intensive, time consuming and inaccurate, if done at all. Entries to the database had to be entered manually, or scanned into a digital format, converted to a textual context format by an optical character recognition application and then entered into the database. Since there is no single uniform format for a resume, each resume must be reviewed by a human who identifies areas of interest, or likely interest for the user. This information is then entered into a category in the database. If more than one person is reviewing the resumes then there is the possibility that variability in categorization can occur due to differences in reviewer interpretation.

Recently, there have emerged a number of Internet business entities ("e-businesses") that provide recruiting services to companies by posting job listings for a fee, such as,"Monster.com™" and "Hotjobs.com™". A statistic used by these e-businesses to entice client companies is the number of resumes that are available in their databases. A large number of available resumes translates to a larger pool of potential candidates available to the e-businesses' clients. Resumes are typically submitted to these e-businesses through the web. However, the submission process is not efficient.

For example in the case of Monster.com, the resume submitter is not able to simply supply a copy of his or her resume, rather, the information from the resume must be enter into the Monster.com system according to specified fields. If the resume submitter wanted to submit his or her resume to another e-business soliciting for resumes, this process would have to be repeated. Therefore, the prior method of submitting a resume to an e-business is cumbersome and presents a barrier to collecting resumes for these e-businesses.

The present invention provides a method of taking advantage of the increasing number of publicly available resumes that are posted to the Internet. The present invention provides a method of creating and updating a database based on such resumes and related documents. In this manner, the number of resumes in the database of such an e-business could be increased dramatically, and kept up to date automatically. These are features that are of value the e-businesses' clients. Another aspect of the present provides a method of reviewing the identified resume to insure that the individual posting the resume desires to be contacted. In some instances, individuals posting their resume indicate that they do not want to be contacted, in such cases, the resume would be tagged by the present invention such that the user does not contact said individual. Another aspect of the present invention provides for e-mail notification to the resume poster that their resume and related documents have been identified from a network of documents, such as, the Internet, a local area network or an intranet, as being of potential interest to an employer, and permission is requested from the resume poster prior to making this information available to said potential employer.

The present invention provides the user with many benefits, including but not limited to the following. For example, the method is automated and performed by computers. Therefore, the databases can be automatically created and updated in any desired time frame. Also because the process is performed by computers, the resultant database is more uniform and consistent since the extraction and classification process is free of variation from human interpretation. In the present invention, categorization of extracted information is performed by the classifier according to consistent and set regime. This is an important feature because as long as the categorization process is consistent, all information that is consistent with the classifier content model type is assigned to the same category. Therefore, even if the information assigned to a less than optimal category, the information can still be located.

A database of resumes of potential job candidates created and updated by the present invention is very useful. Without such a database, the process of tracking and prioritizing resumes is reduced to the ability of the user to manually manage this body of information. Having such a database allows the user to easily review and prioritize potential candidates according to various user desired attributes by submitting and refining search parameters according to the results. For example, in the instance where the database returns an insufficient number of candidates for desired attribute, the database search can be easily broaden to increase the number of potential candidate. Conversely, if a search returns a large number of potential candidates, the search can be narrowed to decrease the number. In both cases, the database is a tool for providing the user with an optimal number of resumes to review. In addition, the present invention provides a feature where additional information about the resume submitter may be also collected and made available to the user for review. The user is thus able to identify a list of potential candidates and evaluate aspects of their qualification through additional publicly available documents before making a decision whether to contact said resume submitter. Another aspect of the present invention provides for the incorporation into the database of resumes and other relevant documents that are received in paper form. This is done using known applications for reducing such paper documents into a digital format, such as scanning .and the like, and further converting such digital data into a textual content format by utilizing optical character recognition applications or the like.

Another aspect of the present invention provides an automated method of managing the recruitment functionality for a business organization by creating and updating a database of resumes. Such a database contains resumes located and retrieved from the Internet, as well as, resumes that have been submitted through traditional methods, e.g., by mail, fax or delivered by hand. The present invention is of use to traditional human resources or recruiting departments in a company. The present invention is of particular use for companies or individuals in organizations that lack the size or infrastructure to support a traditional human resource functionality. In this instance, the user is typically the manager of a department or a work group seeking to identify a qualified candidate for a position without the support of a human resource functionality. In certain instances, a company may want to utilize such a database in lieu of support from a human resource group for identifying possible candidates, since the present invention would permit the person who is seeking the new employee to do the selection. This provides added efficiencies to the process because the person who is requesting the new employee is typically best positioned to determine whether the candidate has the requisite technical skill, and personal style needed for the position being filled. The efficiencies in managing the recruitment process provided by the present invention results also makes the human resource functionality more efficient. Utilizing a database created and updated by a the present invention, results in less time and effort required to identify and keep track of possible candidates. Thereby allowing human resource departments to address other human resource areas of responsibilities, such as, benefits, employee morale, and the like.

Another embodiment of the present invention provides an automated method of creating or updating a database, said method comprising the steps for, a) a step for training a spider to retrieve relevant documents to example documents from a network of documents;

b) a step for retrieving said relevant documents from said network of documents;

c) a step for extracting information from said retrieved relevant documents;

d) a step for classifying said extracted information;

e) a step for storing said extracted information into a database;

f) a step for determining whether said information are links to other documents;

g) a step for ranking said links according to relevancy to said taxonomy, and storing said links in said retrieval priority list according to said relevancy;

h) a step for terminating said method, provided that said method's stop criteria have been met; and i) repeating steps b) through h), provided said method's stop criteria has not been met. One particular aspect of this embodiment is where said database, is a database of resumes.

One particular aspect of the present embodiment is where the act of harvesting information from specified fields is according to a Harvester Content Type Model. For example, a Harvester Content Type Model can be developed to locate and extract field of information that is of interest to a potential employer or recruiter ("user"), such fields include but are not limited to the following information about the potential candidate, name, address, phone number, e-mail address, career objective, educational history (e.g., allowing for multiple records with information relating to degree awarded, subject, grade point average, date of graduation, honors awarded, school and location of school), employment experience (e.g., allowing for multiple records with information relating to duration of work, employer, position, location of company, salary history, skills used, skills developed, and accomplishments), salary desired, skills/qualifications, personal interests, and references.

Another particular aspect of the present embodiment is where the act of classifying the information is according to a Classifier Content Type Model. Yet another aspect of the present embodiment is where the act of determining the link's relevancy to the subject taxonomy is determined according to a Classifier Content Type Model. For example, typical types of categories of information that may be of interest, include but are not limited to the exemplary fields of information extracted by the harvester, as previously taught above. Still another aspect of the present embodiment is where the act of determining the link's relevancy to the subject taxonomy is determined according to a Directed Graph Cluster Module.

Another embodiment of the present invention is a method of locating a document or set of documents in a database relevant to a topic, the method comprising, a) an act of receiving a topic;

b) an act of applying the topic to the subject taxonomy of the database created from a system that generates the database by performing a method comprising:

c) entering at least one example document that is relevant to a subject taxonomy in a retrieval priority list, if there is a plurality of example documents stored in said retrieval priority list, ranking said example documents according to the relevancy of said example documents to said subject taxonomy;

d) retrieving a document from a network of documents, where said document is the most relevant document to said subject taxonomy stored in said retrieval priority list;

e) harvesting information from specified fields of said document;

f) classifying said information into one or more classes according to specified categories of said subject taxonomy;

g) storing said information into a database;

h) determining whether said information are links to other documents;

i) ranking said link's according to relevancy to said subject taxonomy, and storing said links in said retrieval priority list according to said relevancy;

j) terminating said method, provided said method's stop criteria have been met; and k) repeating steps d) through j), provided said method's stop criteria has not been met.

Another embodiment of the present invention provides a computer system for creating or updating a database, the computer system comprising, a) a central processing unit that can establish communication with the network; and b) program memory that stores programming instructions that are executed by the central processing unit such that the computer system executes a method comprising, c) entering at least one example document that is relevant to a subject taxonomy in a retrieval priority list, if there is a plurality of example documents stored in said retrieval priority list, ranking said example documents according to the relevancy of said example documents to said subject taxonomy;

d) retrieving a document from a network of documents, where said document is the most relevant document to said subject taxonomy stored in said retrieval priority list;

e) harvesting information from specified fields of said document;

f) classifying said information into one or more classes according to specified categories of said subject taxonomy;

g) storing said information into a database;

h) determining whether said information are links to other documents;

i) ranking said link's according to relevancy to said subject taxonomy, and storing said links in said retrieval priority list according to said relevancy;

j) terminating said method, provided said method's stop criteria have been met; and k) repeating steps d) through j), provided said method's stop criteria has not been met.

Another embodiment of the present invention provides a program product for use in a computer system that executes program steps recorded in a computer-readable media to perform a method of creating or updating a database, the method comprising, a) entering at least one example document that is relevant to a subject taxonomy in a retrieval priority list, if there is a plurality of example documents stored in said retrieval priority list, ranking said example documents according to the relevancy of said example documents to said subject taxonomy;

b) retrieving a document from a network of documents, where said document is the most relevant document to said subject taxonomy stored in said retrieval priority list;

c) harvesting information from specified fields of said document;

d) classifying said information into one or more classes according to specified categories of said subject taxonomy;

e) storing said information into a database;

f) determining whether said information are links to other documents;

g) ranking said link's according to relevancy to said subject taxonomy, and storing said links in said retrieval priority list according to said relevancy;

h) terminating said method, provided said method's stop criteria have been met; and i) repeating steps b) through h), provided said method's stop criteria has not been met.

Another embodiment of the present invention provides a method of locating a document or set of documents in a database relevant to a topic, the method comprising the steps of, a) a step for receiving a topic;

b) a step for applying the topic to the subject taxonomy of the database created from a system that generates the database by performing a method comprising:

c) a step for training a spider to retrieve relevant documents to example documents from a network of documents;

d) a step for retrieving said relevant documents from said network of documents;

e) a step for extracting information from said retrieved relevant documents;

f) a step for classifying said extracted information;

g) a step for storing said extracted information into a database;

h) a step for determining whether said information are links to other documents;

i) a step for ranking said links according to relevancy to said taxonomy, and storing said links in said retrieval priority list according to said relevancy;

j) a step for terminating said method, provided that said method's stop criteria have been met; and k) repeating steps d) through j), provided said method's stop criteria has not been met.

A system constructed in accordance with the invention creates a database by placing a starting document into a retrieval priority list. The document is compared with a subject taxonomy and is then harvested by determining a category into which the document will be placed, wherein the category is specified by a taxonomy of subject categories. The document is next classified into one or more classes within the taxonomy categories and a database entry is generated that points from the classes to the document. Either the single document can be harvested, or all documents at a common domain or web site may be queued and harvested in this manner. For each document harvested, the system further processes each document by determining links in the document that point to other documents of the network (even if in other domains) and by adding these linked documents to the processing queue. The linked documents in the processing queue are then processed by repeating the steps of retrieving, harvesting, and classifying.

An embodiment of the present invention is a method of creating a database of documents for query searching, the method comprising, retrieving a starting document located at a network address into a retrieval processing queue;

comparing the document with a subject taxonomy;

harvesting information from specified fields in said document that is relevant to said subject taxonomy;

classifying the document into one or more classes within the taxonomy category;

storing the document into an index comprising links from the classes to the starting document;

determining links in the document that point to other documents of the network;

adding the linked documents to the data store processing queue;

repeating the steps of comparing, harvesting, classifying, and determining for each linked document in the data store processing queue until a stopping criterion is reached.

Another embodiment of the present invention provides a method of locating a document in a collection having relevance to a search query, the method comprising:

receiving the search query;

comparing terms of the search query to an database created from a system that generates the database by performing a method comprising:

receiving a starting document located at a network address into a data store processing queue;

comparing the document with a subject taxonomy;

harvesting information from specified fields in said document that is relevant to said subject taxonomy;

classifying the document into one or more classes within the taxonomy category;

storing the document into an index comprising links from the classes to the starting document;

determining links in the document that point to other documents of the network;

adding the linked documents to the data store processing queue;

repeating the steps of comparing, harvesting, classifying, and determining for each linked document in the data store processing queue until a stopping criterion is reached; and returning links to documents identified by the database as matching the search query terms.

Another embodiment of the present invention provides a computer system for generating an database of a network document collection for searching, the system comprising:

a central processing unit that can establish communication with the network; and program memory that stores programming instructions that are executed by the central processing unit such that the computer system establishes communication with the network and communicates with a network user, such that the computer system receives a starting document located at a network address into a data store processing queue of the computer system, comparing the document with a subject taxonomy, harvesting information from specified fields in said document that is relevant to said subject taxonomy, classifying the document into one or more classes within the taxonomy category, storing the document into an index comprising links from the classes to the starting document, determining links in the document that point to other documents of the network, adding the lined documents to the data store processing queue, repeating the steps of comparing, harvesting, classifying, and determining for each linked document in the data store processing queue until a stopping criterion is reached.

Another embodiment of the present invention provides a program product for use in a computer system that executes program steps recorded in a computer-readable media to perform a method for processing a computer file request to retrieve a network data file comprising a web site page, the program product comprising:

a recordable media; and a program of computer-readable instructions executable by the computer system to perform method steps comprising:

receiving a starting document located at a network address into a data store processing queue;

comparing the document with a subject taxonomy;

harvesting information from specified fields in said document that is relevant to said subject taxonomy;

classifying the document into one or more classes within the taxonomy category;

storing the document into an index comprising links from the classes to the starting document;

determining links in the document that point to other documents of the network;

adding the linked documents to the data store processing queue;

repeating the steps of comparing, harvesting, classifying, and determining for each linked document in the data store processing queue until a stopping criterion is reached.

Another embodiment of the present invention provides a method of managing a database maintained at a first component from a second component using an internet browser application, wherein the database is comprised of references developed from documents on the Internet, the method comprising, a) an act of initiating contact from a second component to a first component;

b) an act of receiving status and content information at the second component transmitted from the first component;

c) an act of transmitting management instructions from the second component to the first component;

d) an act of receiving updated status and content information transmitted from the first component;

e) repeating acts b), c) and d), as desired; and f) an act of terminating contact from the second component to the first component at completion of management tasks.

A particularly advantageous aspect of the present embodiment is where the contact is through the Internet, a local area network, or an intranet.

Another particularly advantageous aspect of the present embodiment is where the management instructions are for the placement of documents into a taxonomy.

Another embodiment of the present invention provides a computer system for managing a database maintained at a first component from a second component using an internet browser application, wherein the database is comprised of references developed from documents on the Internet, the system comprising, a) an act of initiating contact from a second component to a first component;

b) an act of receiving status and content information at the second component transmitted from the first component;

c) an act of transmitting management instructions from the second component to the first component;

d) an act of receiving updated status and content information transmitted from the first component;

e) repeating acts b), c) and d), as desired; and f) an act of terminating contact from the second component to the first component at completion of management tasks.

Another embodiment of the present invention provides a program product for use in a computer system that executes program steps recorded in a computer-readable media to perform a method of managing a database maintained at a first component from a second component using an internet browser application, wherein the database is comprised of references developed from documents on the Internet, the method comprising, a) an act of initiating contact from a second component to a first component;

b) an act of receiving status and content information at the second component transmitted from the first component;

c) an act of transmitting management instructions from the second component to the first component;

d) an act of receiving updated status and content information transmitted from the first component;

e) repeating acts b), c) and d), as desired; and f) an act of terminating contact from the second component to the first component at completion of management tasks.

Yet another embodiment of present invention provides a method of providing database management services to a database maintained at a first component from a second component using an internet browser application, wherein the database is comprised of references developed from documents on the Internet, the method comprising, a) an act of receiving initial contact at a first component from a second component;

b) an act of transmitting status and content information to the second component from the first component;

c) an act of receiving management instructions at the first component from the second component;

d) an act of transmitting updated status and content information from the first component to the second component following completion of the instructions by first component;

e) repeating acts b), c) and d), as instructed; and f) an act of terminating contact with the second component when receiving such instructions from the second component.

A particularly advantageous aspect of the present embodiment is where the contact is through the Internet, a local area network, or an intranet.

Another particularly advantageous aspect of the present embodiment is where the management instructions are for the placement of documents into a taxonomy.

Another embodiment of the present invention provides a computer system for providing database management services to a database maintained at a first component from a second component using an internet browser application, wherein the database is comprised of references developed from documents on the Internet, the method comprising, a) an act of receiving initial contact at a first component from a second component;

b) an act of transmitting status and content information to the second component from the first component;

c) an act of receiving management instructions at the first component from the second component;

d) an act of transmitting updated status and content information from the first component to the second component following completion of the instructions by first component;

e) repeating acts b), c) and d), as instructed; and f) an act of terminating contact with the second component when receiving such instructions from the second component.

Another embodiment of the present invention provides a program product for use in a computer system that executes program steps recorded in a computer-readable media to perform a method of providing database management services to a database maintained at a first component from a second component using an internet browser application, wherein the database is comprised of references developed from documents on the Internet, the method comprising, a) an act of receiving initial contact at a first component from a second component;

b) an act of transmitting status and content information to the second component from the first component;

c) an act of receiving management instructions at the first component from the second component;

d) an act of transmitting updated status and content information from the first component to the second component following completion of the instructions by first component;

e) repeating acts b), c) and d), as instructed; and f) an act of terminating contact with the second component when receiving such instructions from the second component.

Other features and advantages of the present invention should be apparent from the following description of the preferred embodiment, which illustrates, by way of example the principles of the invention.

EXAMPLE

FIG. 1 is a block diagram representation of a system 100 for retrieving, extracting and categorizing, information, such as, hypertext links from documents identified from a network of documents, such as, the World Wide Web, the internet, an local area network ("LAN"), an intranet or the like. The system provides access or information for accessing just those documents located within a network documents that are relevant to a given information need. A Back-End component 102 employs a classification scheme as implemented by the Spider, Harvester and Classifier to process documents from a network of documents 104 in order to place information from the documents into appropriate nodes in a taxonomy. The classified information comprise a database 106. If desired, the database 106 can be stored at either the Back-End 102 or at a Front-End component 108, preferably at the Back-End. The Front-End component provides a convenient interface that is accessed by a user 110. The user provides an information need to the Front-End, which applies the information need against the database 106 to identify information, for example, hypertexted links, to documents 104 that are relevant to the information need. The documents can then be retrieved by the user. In this way, documents from a network of documents can be efficiently located, harvested, and classified, and thus provided for efficient retrieval.

The system 100 can be implemented in a variety of configurations. For example, the Back-End component 102 may comprise a primary service provider, who maintains the database 106 and provides access to the Front-End 108, which may comprise a secondary service provider, who charges access fees to user 110. Alternatively, the Front-End and Back-End may comprise a single point of access to users 110. In the preferred embodiment, the network of documents 104 comprise all the resources available over the Internet, including the "World Wide Web", LANs, intranets, or the like; and the Back-End component 102 and Front-End component 108 comprise separate computer systems that communicate with each other. The users 110 comprise networked computers who communicate with the Front-End and thereby gain access to the database 106 for searching and to the documents 104 for retrieving. Alternatively, all the computers can be implemented as a single computer having the various components 102, 108, 110, or the components can communicate over a local area network (LAN) or intranet.

Figure 2:
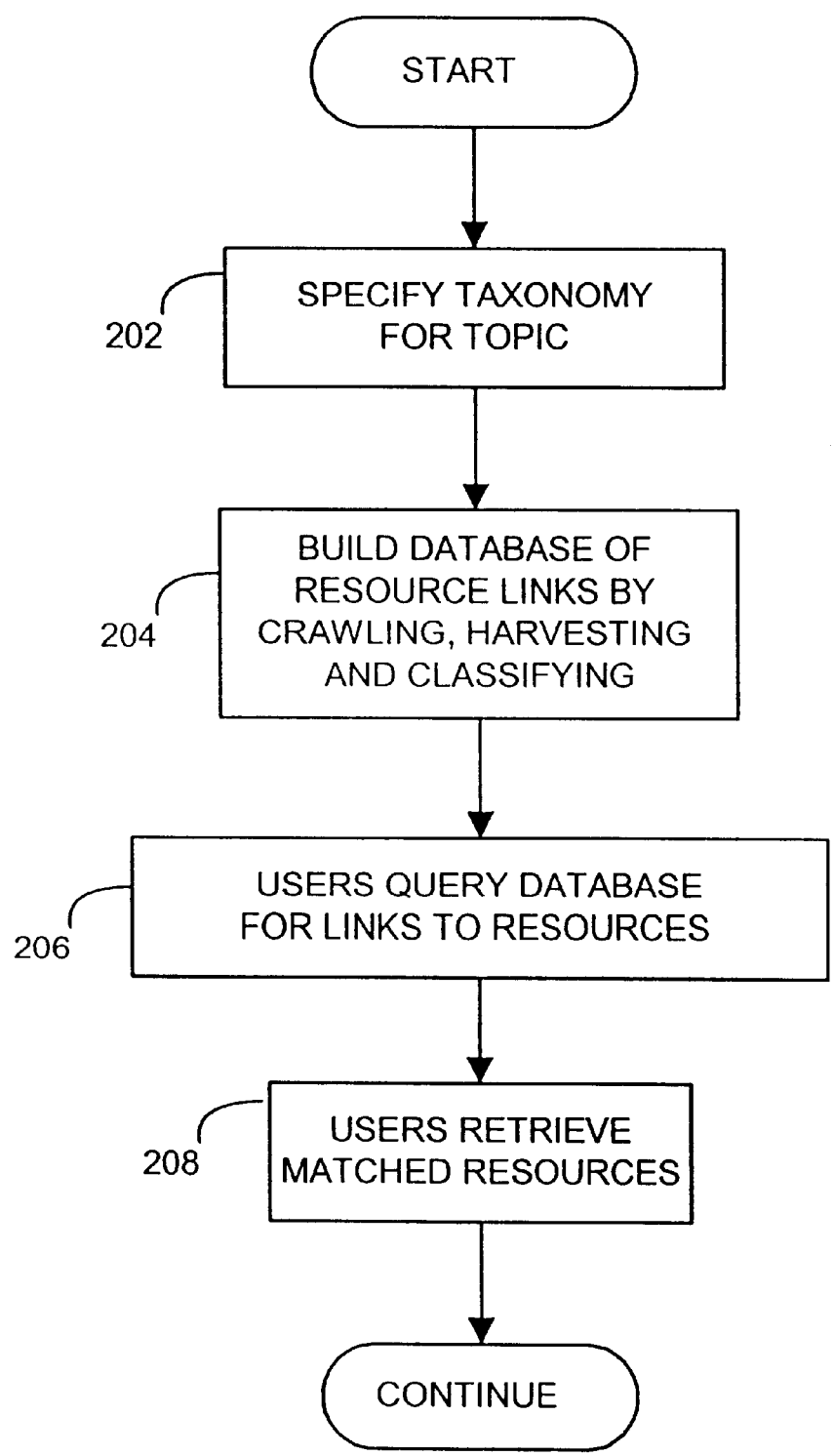
FIG. 2 is a flow diagram that illustrates the operations performed in utilizing the system illustrated in FIG. 1.

FIG. 2 is flow diagram that illustrates the operations performed in utilizing the system illustrated in FIG. 1. First, a taxonomy 202 is specified for a topic of interest. For example, it may be desired to create an database of resources relating to the "Java™" programming language. The taxonomy comprises a hierarchy of titles or categories that specify an outline for a topic. Those skilled in the art will be familiar with the multiple ways in which a hierarchy may be represented for computer use, such as linked lists and tables. If the Front-End and Back-End are separate providers, then the taxonomy may be provided by either provider, or may be developed in joint consultation. In either case, the taxonomy is then used to build an database of resource links by crawling, harvesting, and classifying, as described further below.

The building operation is represented by the flow diagram box numbered 204. After the database is completed, the next operation is to permit user access to the database for query matches that identify resources of interest. This step is represented by the flow diagram box numbered 206. In the final operating step represented by the flow diagram box numbered 208, users retrieve the resources identified by the resource links. Typically, the resource links will be the resource's URL, or hyperlinked text, or some other method of accessing the document on the world wide web that are known to those of skill in the art. Other operations may then continue. From time to time, database maintenance may be performed, for example in order to update the database with new documents so that these new resources are available for retrieval.

Computer Configuration

Figure 3:
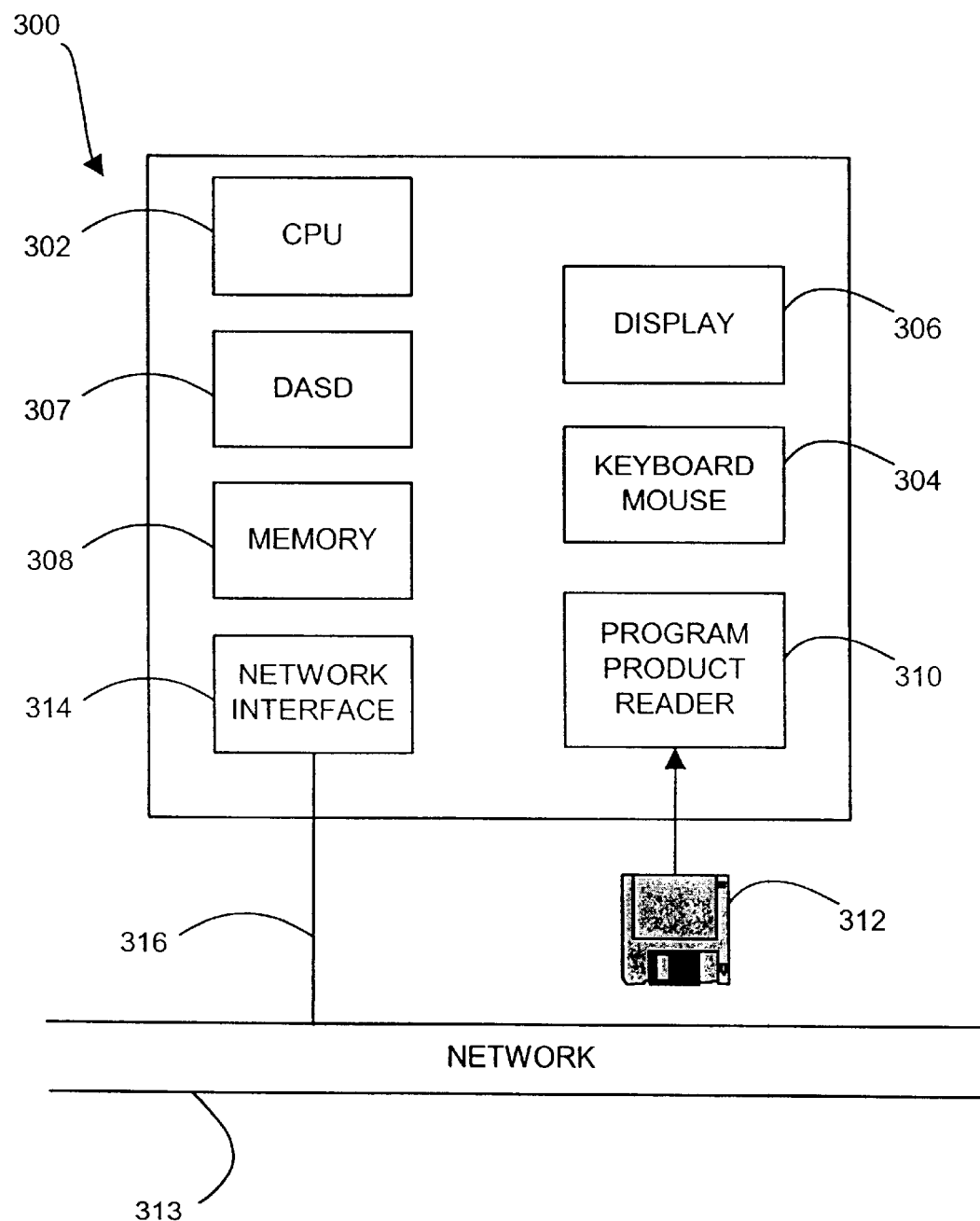
FIG. 3 is a block diagram representation of a computer in the FIG. 1 system.

FIG. 3 is a block diagram of an exemplary computer 300 such as might comprise any of the computers of the Back-End component 102, the Front-End component 108, or the users 110. Each computer 300 operates under control of a central processor unit (CPU) 302, such as a "Pentium®" microprocessor and associated integrated circuit chips, available from Intel Corporation of Santa Clara, Calif., USA. A computer can input commands and data from a keyboard and mouse 304 and can view inputs and computer output at a display 306. The display is typically a video monitor or flat panel display device. The computer 300 also includes a direct access storage device (DASD) 307, such as a fixed hard disk drive. The memory 308 typically comprises volatile semiconductor random access memory (RAM). Each computer preferably includes a program product reader 310 that accepts a program product storage device 312, from which the program product reader can read data (and to which it can optionally write data). The program product reader can comprise, for example, a disk drive, and the program product storage device can comprise. removable storage media such as a floppy disk, an optical CD-ROM disc, a CD-R disc, a CD-RW disc, DVD disk, or the like. Each computer 300 can communicate with the other connected computers over the network 313 through a network interface 314 that enables communication over a connection 316 between the network and the computer.

The CPU 302 operates under control of programming steps that are temporarily stored in the memory 308 of the computer 300. When the programming steps are executed, the pertinent system component performs its functions. Thus, the programming steps implement the functionality of the system components 102, 108 illustrated in FIG. 1. The programming steps can be received from the DASD 307, through the program product 312, or through the network connection 316. The storage drive 310 can receive a program product, read programming steps recorded thereon, and transfer the programming steps into the memory 308 for execution by the CPU 302. As noted above, the program product storage device can comprise any one of multiple removable media having recorded computer-readable instructions, including magnetic floppy disks, CD-ROM, and DVD storage discs. Other suitable program product storage devices can include magnetic tape and semiconductor memory chips. In this way, the processing steps necessary for operation in accordance with the invention can be embodied on a program product.

Alternatively, the program steps can be received into the operating memory 308 over the network 313. In the network method, the computer receives data including program steps into the memory 308 through the network interface 314 after network communication has been established over the network connection 316 by well-known methods that will be understood by those skilled in the art without further explanation. The program steps are then executed by the CPU 302 to implement the processing of the system.

It should be understood that all of the computers of the system 100 illustrated in FIG. 1 preferably have a construction similar to that shown in FIG. 3, so that details described with respect to the FIG. 3 computer 300 will be understood to apply to all computers of the system 100. Any of the computers can have an alternative construction, so long as they can communicate with the other computers and support the functionality described herein.

The Back-End Component

Figure 4:
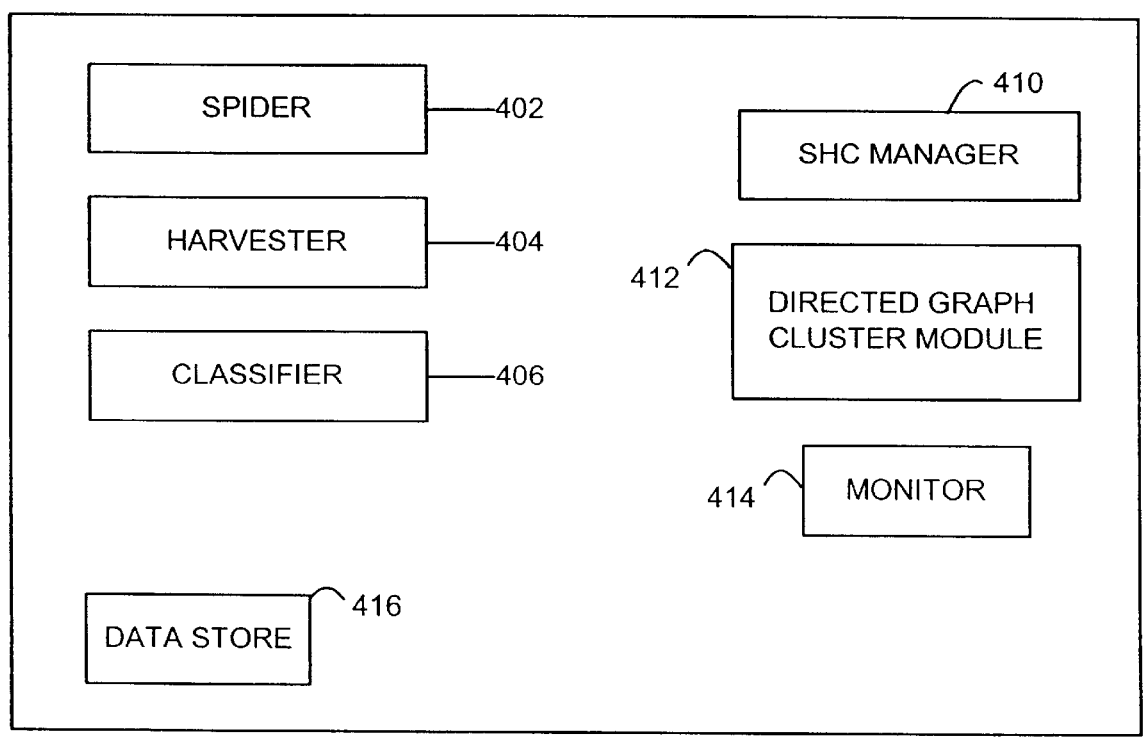
FIG. 4 is a block diagram representation of the organization of the Back-End component illustrated in FIG. 1.

FIG. 4 is a block diagram representation of the organization of the Back-End component 102 illustrated in FIG. 1. FIG. 4 shows that the Back-End of the preferred embodiment includes a spider 402, Harvester 404, and Classifier 406, an SHC Manager 410, a Directed Graph Cluster Module 412, a Monitor 414, and a Data store facility 416. With this architecture, the Back-End component 102 supports multiple Front-End providers. More particularly, the Spider 402, Harvester 404, and Classifier 406 can operate independently. This provides easier support and maintenance for multiple Front-End 108 components, and the increased parallelism provides good scalability and accommodation of high peak loads on the system.

The SHC Manager 410 manages the operation of the Spider, Harvester and Classifier, and operates according to a cyclical schedule, periodically receiving jobs comprising requests for crawling, harvesting, and classifying documents from the world wide web for inclusion into a taxonomy. The job requests will come from a variety of Front-End providers who have arranged with the Back-End to create a database specified by their respective topic taxonomy. The SHC Manager periodically checks the Data store for job configuration data to determine currently running jobs, including the status of newly received jobs. The SHC Manager will select a predetermined number of job requests for processing. It is the function of the SHC Manager 410 to determine the tasks that need to be performed and to apportion tasks among the Spider 402, Harvester 404, and Classifier 406. The SHC Manager may temporarily store results of a job by a module ("upstream module") in the Data store, while waiting for the next module ("downstream") in the process to complete a pending task. When the "downstream" module is finished with its task, the next job is forwarded to it from Data store. This process allows the modules to operate in parallel, thereby increasing system efficiency. Those of skill in the art will appreciate that there can be a plurality of module types, for example, multiple spiders, harvester, and classifier, in the system. The plurality of modules further enhances the parallel operation of the system and enables it to process jobs quickly and efficiently. When the SHC Manager receives a job request, it receives a starting network address. For example, in the case of the Internet, the SHC Manager will receive a web site address, also referred to as the Uniform Resource Locator (URL). The URL is an Internet address where a web page can be found and indicates a starting URL for a web site (resource) to be processed by the system.

The SHC Manager 410 takes each beginning URL and provides it to the Spider 402. The Spider examines each web page to determine the links it contains. Those skilled in the art will be aware that web pages that relate to a particular topic often contain links, which are pointers to additional web pages on related topics. It is the function of the Spider to identify the links that are contained on a web page being processed, which the Spider receives from the SHC Manager. The Spider provides the identified links to the SHC Manager, which schedules further processing. The Harvester 404 receives and extracts information from the contents of the pages. That is, text of the linked web page is assumed to be descriptive of the page contents, and is associated with the link itself. The Classifier 406 receives the descriptive text and processes it to determine the category in the taxonomy into which the linked web page is most closely associated.

The SHC Manager 410 receives the taxonomy category into which the Classifier 406 has placed a document and stores the extracted information in the corresponding taxonomy category of the database being built. As noted above, the Spider 402 may identify many links from a page being processed and will provide these to the SHC Manager. The Classifier provides the category or categories into which a document should be classified. The SHC Manager adds links from the document that were extracted and classified to a retrieval priority list in the Data store 416. At the next iteration of the SHC Manager, when it next checks job configuration, those links will be among the links provided by the SHC Manager to the Spider, Harvester, and Classifier for processing. The SHC Manager 410 generates statistics on each job or documents processed, such as the number of links identified, the number of documents processed, the amount of processing time for the documents, as well as other statistics indicative of efficiency.

It should be apparent that it is possible for the processing task to become larger and larger, as links are followed from the starting document to additional documents, and the links on those additional documents are, in turn, identified by the Spider 402 and are followed to more documents.

Those of skill in the art are familiar with principles and regimes that may be applied in guiding the retrieval, extracting and classification of documents and information from a network of documents. Search regimes for problem solving, and heuristic search methods are discussed in Chapters 3 and 4 of "Artificial Intelligence: A Modern Approach" Prentice Hall Series In Artificial Intelligence, 1995, Stuart J. Russell, and Peter Novig, incorporated herein by reference.

The Directed Graph Cluster Module 412 provides parallel process to that of the Classifier. The Classifier assesses the relevancy of the retrieved document to the search topic according to the relevancy of the links contained in the document and the document. The Directed Graph Cluster Module assesses the relevancy of the document according to the number of links it has to other documents that are relevant to the search topic. A document that is relevant to a given topic will be interconnected and referenced by other similar documents, and this characteristic can be used to assess the document's relevancy. A further discussion of this process is found in the web based article, "Focused Crawling: A New Approach to Topic-Specific Web Resource Discovery", Soumen Chakrabarti, Martin van den Berg, and Byron Dom, Mar. 29, 1999, 18:29, which was found at the website for the Computer Science Department, University of California, Berkeley.

The Monitor 414 can provide a means of checking system operational status improving performance. For example, the Monitor can automatically halt Spider operations after a predetermined time limit, or can accept a Front-End user-defined halting criterion for stopping Spider or Harvester operation.

Figure 5:
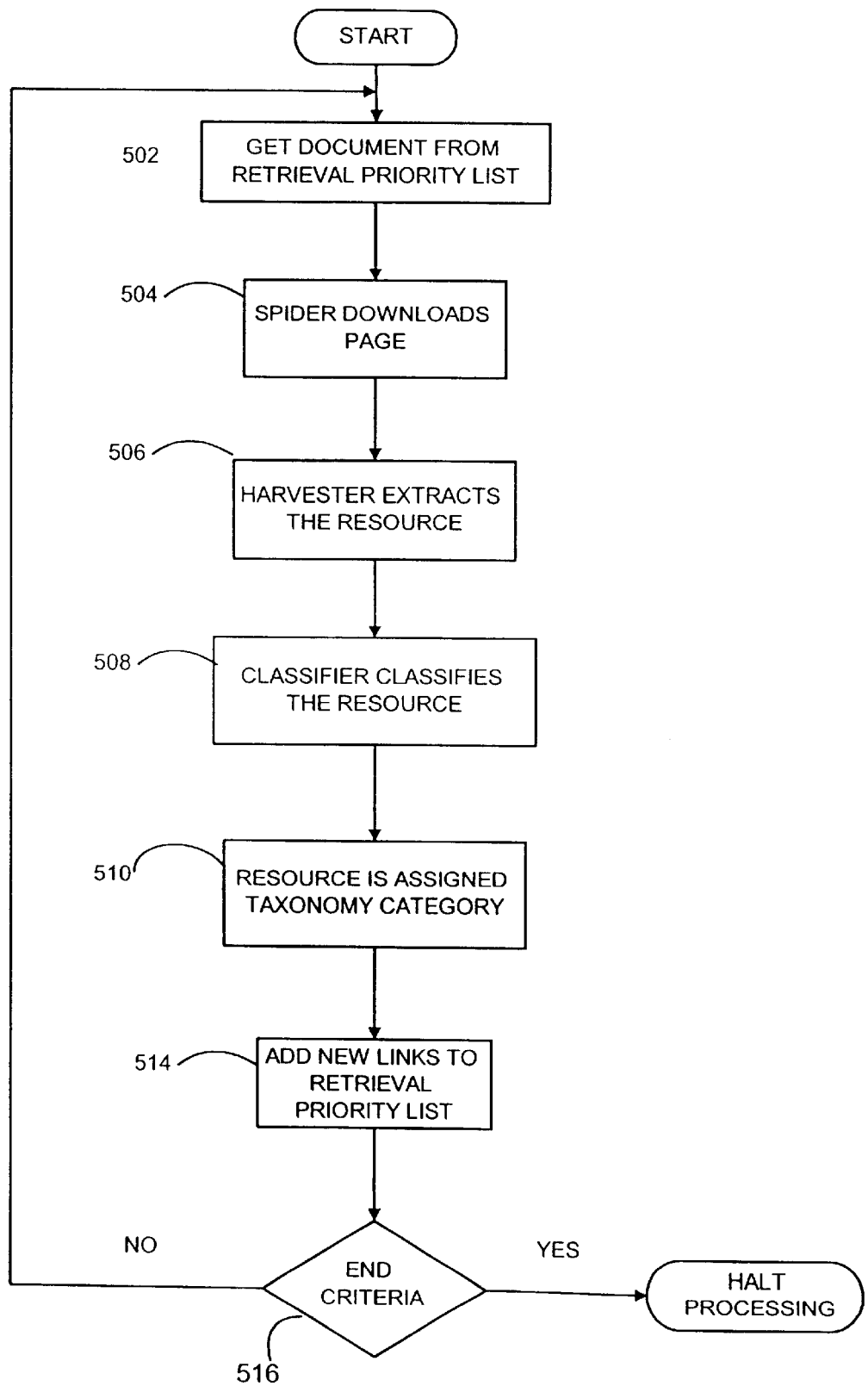
FIG. 5 is a flow diagram that illustrates the processing performed by the Back-End component of FIG. 1.

FIG. 5 is a flow diagram that illustrates the processing performed by the Back-End component 102. In the first operation, represented by the flow diagram box numbered 502, the SHC Manager of the Back-End component receives one or more starting links. As noted above, these starting links are pulled from the processing queue of the Data store 416 and comprise either initial URLs submitted by a Front-End provider or URLs identified by the Spider 402. Next, the Spider receives the next link for processing. This step is represented by the flow diagram box numbered 504. The Spider then downloads the link by requesting the corresponding web page, as indicated by the flow diagram box numbered 504. The Harvester then processes the retrieved document in the step represented by the flow diagram box numbered 506. The Harvester may extract one or more possible resources from a retrieved document. The next step, box 508 indicates that the Classifier processes the extracted resources from the Harvester to determine the appropriate taxonomy categories into which the resources should be placed. The SHC Manager then stores the web page link information into the taxonomy category for the database being built, in the processing operation indicated by the flow diagram box numbered 510.

In the next operation, indicated by the box numbered 514, the extracted resource links are placed in the processing queue of the Data store according to their ranking. Next, at the decision box 516, the system checks to determine if a halting condition has been reached. If it has not, a negative outcome, then processing is continued with the next link at box 504. If a halting condition has been reached, an affirmative outcome at the decision box 516, then link processing for the current web page is halted, and other system processing continues.

Operation of Machine Learning Modules

Figure 7A:
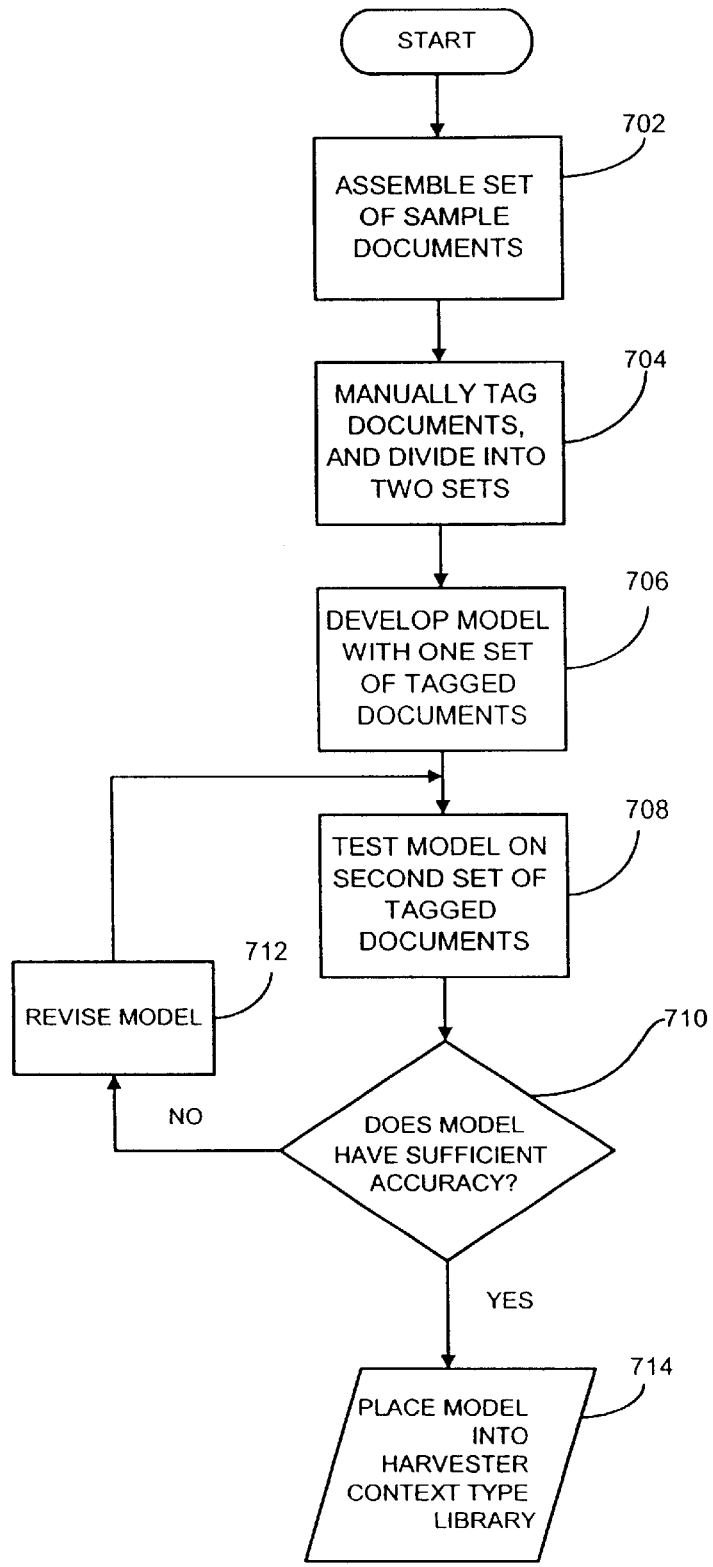
FIG. 7A is a flow diagram that illustrates the processing performed by a Harvester using a Model Builder module.

FIG. 7a is a flow diagram that illustrates an example of a machine learning module used in the present invention to develop content type models. For example, the illustrated process is used to develop a content type library that is used in the Harvester module to direct the extraction of information from retrieved resources, such as, web documents, web pages, and the like. In the first process box 702, a set of sample documents, which exemplify the type of documents that are to be harvested are assembled. In process box 704, the documents are tagged to indicate the types of information that is to be extracted. For example, documents related to journal articles might have text fields such as, the author's name, the title of the article, the URL of the document, and like tagged. Another example where the documents are resumes, might have text fields such as, the name, address, technical expertise, relevant experience, education background, work background and the like tagged. Following the tagging the set of documents are arbitrarily divided into two sets. In the next step as illustrated in box 706, a test model is generated based on one set of documents. The test model to be used as a guide for the harvester in extracting information. In box 708, the test model is tested against the second set of documents for accuracy in retrieving the tagged fields. Since the second set of documents have the desired field tagged, the model accuracy can be readily determined. Box 710 illustrates the evaluation of the accuracy of the model. If the model is sufficiently accurate, it is placed into a context type library for future use, as illustrated in box 714. If the accuracy is not sufficient, the model is refined 712 and re-tested against the second set of training materials, as illustrated in 708.

Figure 7B:
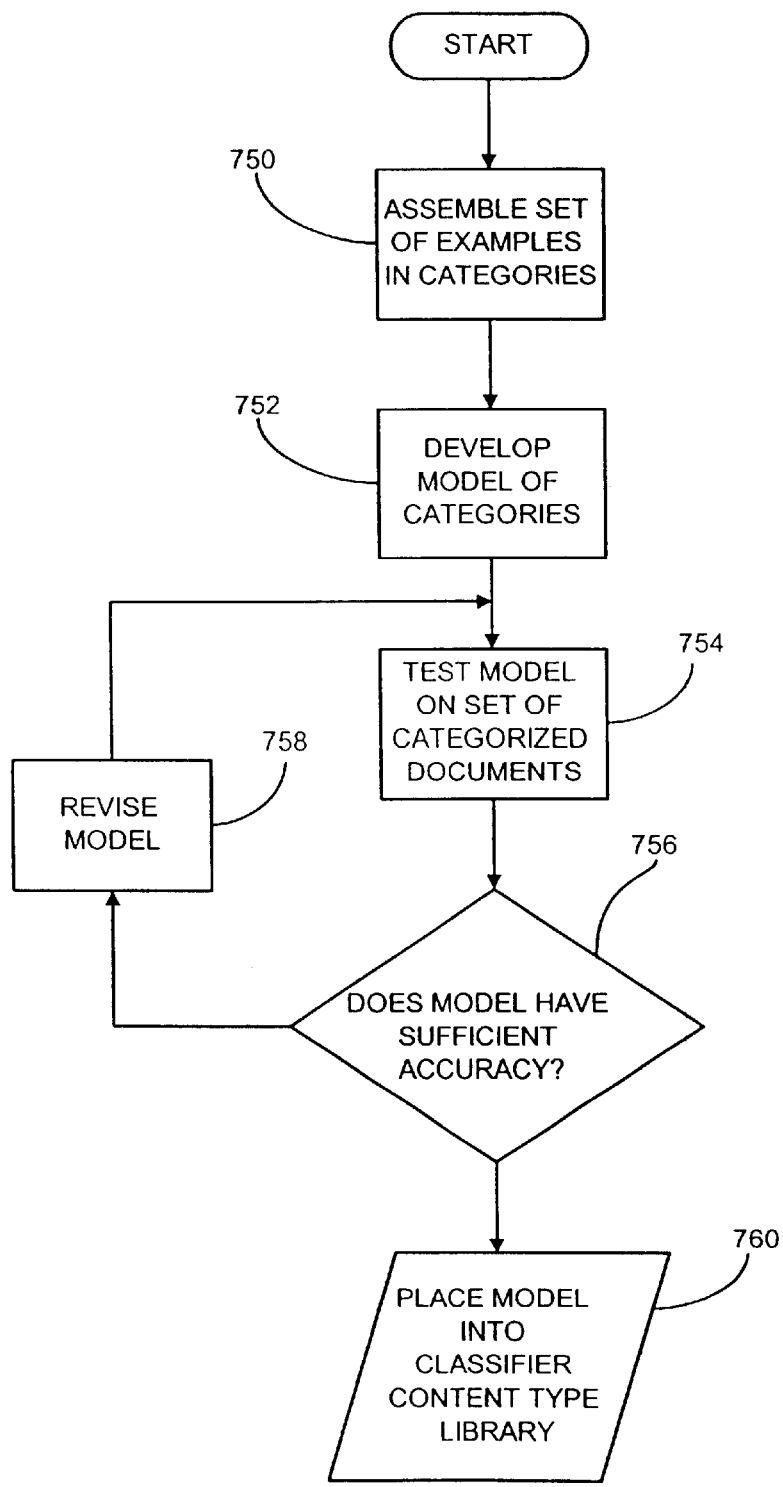
FIG. 7B is a flow diagram that illustrates the processing performed by a Classifier using a Model Builder module.

FIG. 7b is a flow diagram that illustrates an example of a machine learning module used in the present invention to develop content type models. For example, the illustrated process is used to develop a content type library that is used in the Classifier module to direct classification of harvested resources to taxonomy categories. In the first process box 750, a set of example documents are assembled which exemplify the types of documents that are to be assigned to those categories. In process box 752 the module develops a test model of such a categorization scheme. In process box 754, an additional set of pre-categorized documents are processed with the test model. In process box 756, the accuracy of the test model is reviewed. If the accuracy is sufficient, the model is placed into the Classifier Content Type Library for later use. If the accuracy is insufficient, the model is revised and re-tested with the sample set of documents, as illustrated in process box 758.

Operation of the Crawler

Figure 11:
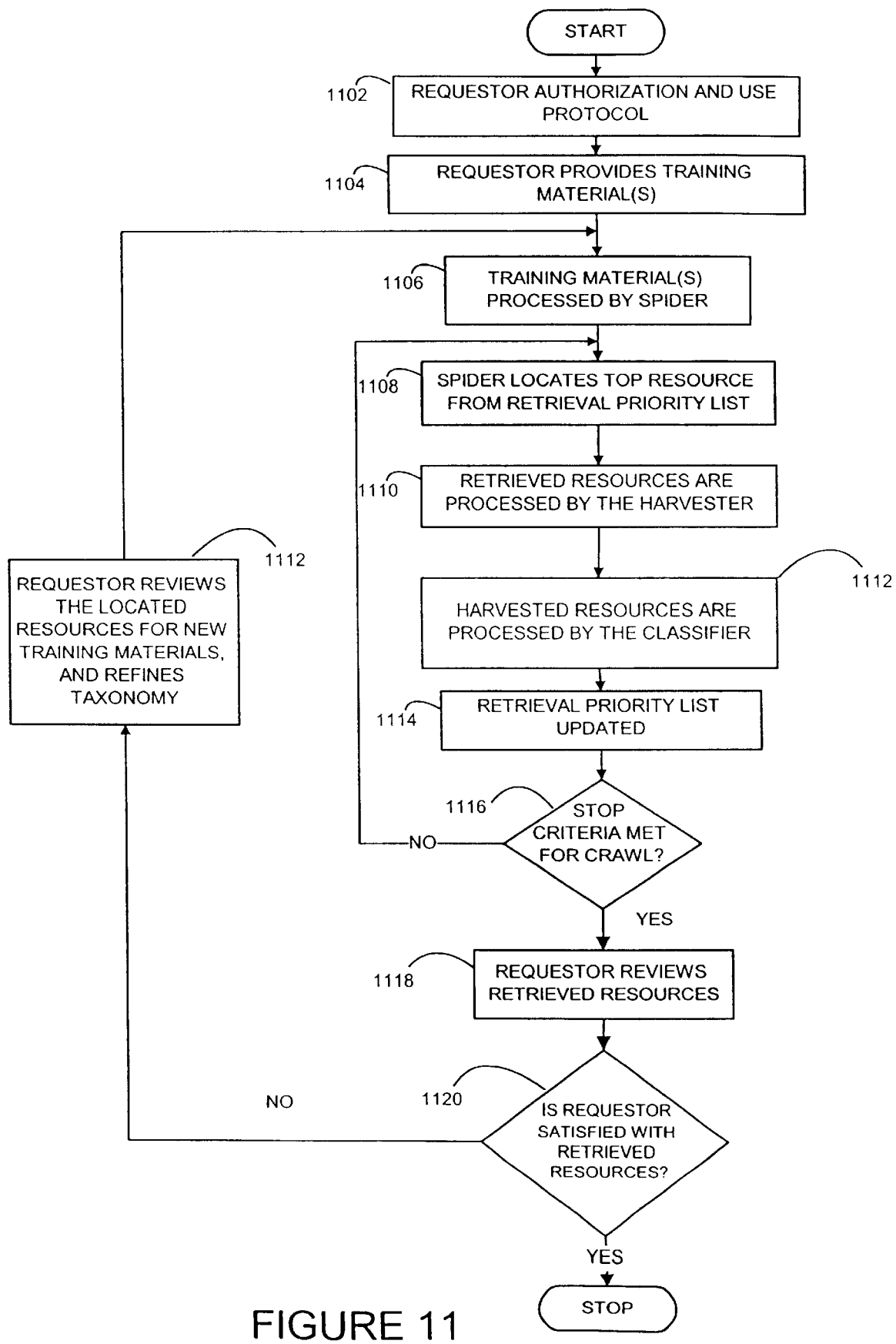
FIG. 11 is a flow diagram that illustrates the processing performed by the Front-End component for a user/client accessing Back-End component illustrated in FIG. 1.

FIG. 11 is a flow diagram that illustrates an example of a crawl initiated either to update an existing database, or to generate a new database. In the first processing operation, represented by the flow diagram box numbered 1102, the requestor of the crawl, either the client at the Front-End component, or the primary service provider at the Back-End, contacts the Back-End component which carries out a authorization process to ensure that the requester of the function has authorization to initiate such process, and that financial charges for the crawl are properly are recorded. In the next processing step, represented by the flow diagram box numbered 1104, the Front-End component transmits to the Back-End component a request for a search, the search criteria, and a set of training materials exemplifying the types of documents desired for the database. Upon receiving the request, the Spider processes the resources using the Classifier to optimize the search, as represented in flow diagram box 1106. The resources are then placed into a retrieval priority list according to a ranking given by the Classifier. In the next step, as represented by flow diagram box 1108, the Spider retrieves a resource from the top of retrieval priority list. The retrieved resource is processed by the Harvester where property information is extracted from the resource, as represented by flow diagram box 1110. In the next step, as represented by flow diagram box 1112, the retrieved resource and the information extracted by the Harvester are organized according to taxonomy by the Classifier, or alternatively all or a sub-set of the resources can be stored into an area for client review prior to entry into the database. Referenced resource links are reviewed by the Classifier, as represented by flow diagram box 1114, and the retrieval priority list is updated accordingly. A check is made to determine if the stop criteria has been reached, as represented by decision box 1116. If the criteria has not been met, the crawl resumes with the Spider retrieving the top most resource from the updated retrieval priority list, as represented by flow diagram box 1108. If the criteria has been met, the requestor is notified, and may review the outcome of the crawl, as represented by flow diagram box 1118. If the requester is satisfied with the results of the crawl, the process is completed, as represented by decision box 1120. Alternatively, the requester can request another crawl. Before beginning the another crawl, the client may update the training materials, for example, with resources retrieved from the previous crawl, as represented by flow diagram box 1122. In addition, the taxonomy may be revised as is deemed necessary by the requestor. The second crawl is then initiated and begins with the processing of the training materials as represented by flow diagram box 1106.

Operation of the Harvester

Figure 6:
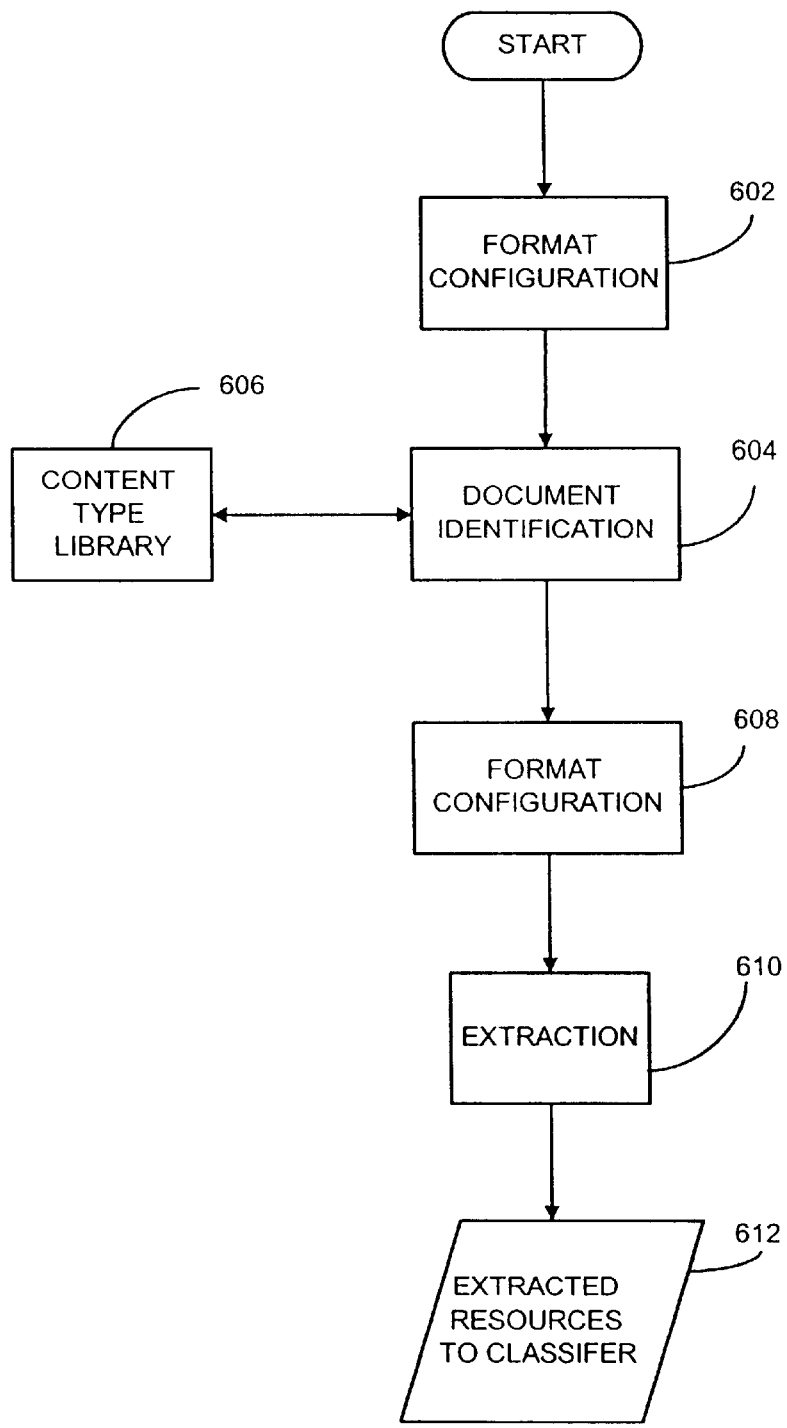
FIG. 6 is a flow diagram that illustrates the processing performed by Harvester.

FIG. 6 is a flow diagram that illustrates the operations performed by the Harvester module of the Back-End component illustrated in FIG. 4. The Harvester receives resources retrieved from the world wide web by the spider, such as, web pages, web documents from the spider and the like. The Harvester module determines the type of document that has been retrieved according to a Content Type model selected from a Content Type Library, and then extracts information from specified fields according to the Content Type model. The extracted information is then passed on to the Classifier.

The first operation of the Harvester module illustrated by flow diagram box number 602 is to format the document by converting the existing format of the document to one that is recognized by the Harvester. For instance, the Harvester may only recognize text in ASCII text format and the document may be in HTML format, in this case the document is converted to ASCII text format. In the next step, the converted document is identified 604, by matching with models from the Content Type Library 606. Once the document has been matched with a Content Type model, the document is formatted according to the model, as illustrated in flow chart box 608. Resources fields in the document are then extracted from the document 610. The extracted resource links are then provided to the Classifier 612.

Operation of the Classifier

Figure 8:
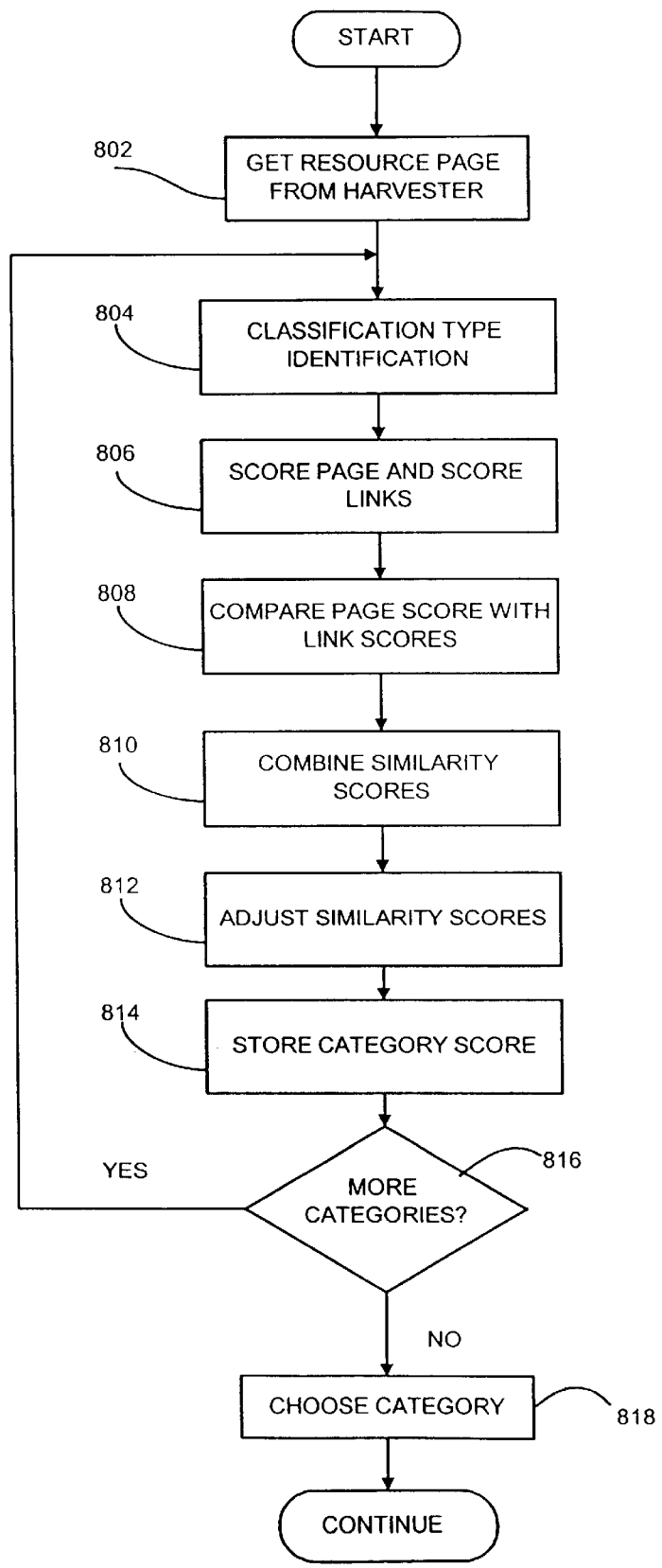
FIG. 8 is a flow diagram that illustrates the operations performed by the Classifier module of the Back-End component illustrated in FIG. 4.

FIG. 8 is a flow diagram that illustrates the operations performed by the Classifier module of the Back-End component illustrated in FIG. 4. The Classifier receives resources, such as web pages, web documents and the like, extracted by a Harvester module and then determines the most appropriate taxonomy location for the resource. The resource includes the link address and a link description. The resource may also contain additional links that the Harvester retrieved. In the preferred embodiment, the Classifier uses the Data store of the Back-End component to determine a taxonomy location for the resource being processed. The Classifier retrieves a model of an exemplary classification from a Classifier Content Type Library to assist in identification of appropriate categories for the resource. As described below, Classifier programming compares the stored data to corresponding taxonomy categorizations, looking for matches between the stored data and the new links, and make corresponding categorizations. Other techniques may also be used. For example, the Classifier may be implemented with neural network learning techniques that can "learn" from prior data.

The first operation of the Classifier, represented by the flow diagram box numbered 802, is to receive a resource page from the Harvester.

In the next step 804, the resource page and links that it may contain are scored, and compared for internal consistency. Ideally the page score and the links score should be similar, indicating that they are directed to the same topic. In the next operation, the Classifier compares the resource page against every harvested resource (page) in a taxonomy category and assigns each comparison a similarity score. That is, each taxonomy category will be assigned a similarity score that indicates the similarity between that category heading and the resource (page) being processed. The comparison may be implemented using, for example, a "Naive Bayes" comparison technique, which will be known to those skilled in the art. This comparison operation is represented by the flow diagram box numbered 806, the Classifier compares the descriptions of the linked pages with the description of the page being processed, again using the "Naive Bayes" technique, and assigns each comparison a similarity score. A typical web page, for example, may contain five or six links.

Using a predetermined concatenation formula, the Classifier combines the score from the comparisons of step 804 and step 806 to produce a priority value. This operation is indicated by the flow diagram box numbered 808. An exemplary formula may be, for example, as follows. Priority Value=3*(step 804 score)+1.5*(step 806 score). It is expected that the formula for the priority value will be determined experimentally, depending on the results obtained and the characteristics of the documents being harvested. The formula above may serve as a starting point.

In the next processing operation, the similarity score for the page being processed is adjusted. The adjustment operation is indicated by the flow diagram box numbered 810. In particular, for every page linking to the page being processed (that is, "incoming" links), a predetermined amount is added to the taxonomy similarity score. In the preferred embodiment, two points are added to the similarity score for incoming links.

Thus, the similarity score for each taxonomy category being checked against the web page for a fit is adjusted. The score is adjusted upward for each incoming link to the web page being processed, and the score is adjusted upward by a lesser amount for each link that would itself be placed in the same taxonomy category. After the scores have been adjusted in this manner, the score for the taxonomy category is sorted in the Data store of the Back-End component. The Classifier then checks for additional taxonomy categories to process at the decision box numbered 814.

If there are additional taxonomy categories, an affirmative outcome at the decision box 814, then processing moves to the comparison operation 804. If all taxonomy categories have been processed, a negative outcome at 814, then processing moves to category selection at the flow diagram box numbered 816. At category selection, the Classifier selects the taxonomy category with the highest adjusted similarity score and assigns the web page to that category location. Alternatively, the Classifier may choose to assign the web page to all taxonomy categories with a similarity score greater than a predetermined threshold value. This aspect of Classifier operation will depend on the design of the database and the resources available. It should be apparent that a greater number of categories will result in more "hits" on a given search query, and will result in more cross references between search terms. If no similarity score is greater than a predetermined minimum score, then the web page is assigned to an "Unknown" taxonomy category. Such assignments can then be reviewed by a human operator for reclassification, if desired. This completes the operation for step 816, and other system operations may then continue.

The Front-End Component

Figure 9:
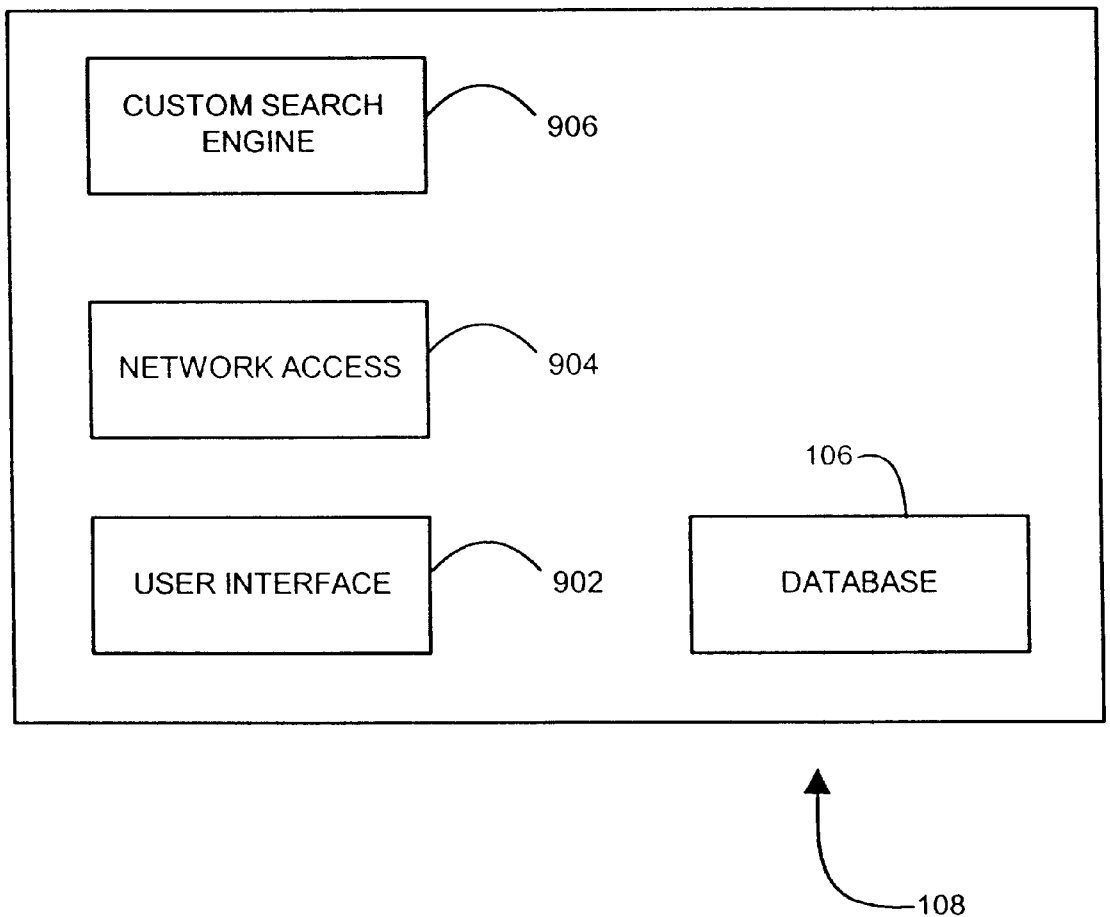
FIG. 9 is a block diagram representation of the organization of the Front-End component illustrated in FIG. 1.

FIG. 9 is a block diagram representation of the organization of the Front-End component 108 illustrated in FIG. 1. The Front-End component permits an user at a network node to search the database created by the Back-End component. Such searches will efficiently identify resources, such as web documents, web pages and the like, that match the user query. The user can then request such resources using conventional methods, such as web browser (http) requests for file transfer protocol (ftp) requests. Such a split between the Back-End component for database creation and the Front-End component for database access permits a greater amount of user customization at the Front-End. This can provide even greater efficiencies.

In the preferred embodiment, the Front-End component 108 includes a user interface 902 that permits convenient communication between the Front-End and network user. For example, the system may be designed so that Internet users access the Front-End through an Internet web portal site. The user interface 902 then comprises the portal site web design. The Front-End also has a network access component 904, which enables communication between the Front-End and the user, and the Front-End and Back-End for data collection and database management functions (FIG. 1). Typically the Front-End accesses the Back-End using a standard internet browser, such as, Microsoft Internet Explorer™, Netscape Navigator™, or the like. This is particularly beneficial for a primary service provider at the Back-End 102, because the primary service provider does not have to provide its Front-End client with additional software or protocols to initiate and maintain communication with the Front-End, thereby eliminating the need to provide software support and update for the Front-End client by the primary service provider. An optional search engine component 906 may be included with the Front-End, if desired. The search engine 906 may be specially adapted to search the database. Alternatively, a conventional search engine such as those mentioned above may be used to search the database. Finally, as described above, the database 106 may be optionally stored at the Front-End. Although illustrated in FIG. 9 as being part of the Front-End, it should be understood that the database 106 may be stored at any network location that can be accessed by the system user 110 (FIG. 1) through the network access component 904.

A particularly advantageous configuration is where the database 106 is stored at the Back-End 102. The configuration alleviates the Front-End 108 client from having to store the database on its storage devices. Further in the instance for a Back-End primary service provider, where the primary service provider is providing database services to a plurality of users/clients, storage of the databases at its location allows the primary service provider the benefit of maintaining the databases from a centralized location. For example, maintenance, updates and any revisions to the software or the database structures can be efficiently accomplished at one location by the primary service provider.

Another preferred embodiment is directed to the instance where the Front-End is with a secondary service provider, that is, a client to the primary service provider. The user interface 902 then comprises an application that enables the client to accesses the Back-End component 102 at the primary service provider's location. The client is able to initiate generation of new databases, initiate updates of existing databases, develop taxonomies for organizing retrieved resources, and manually placing retrieved resources into specific categories of the taxonomy. The graphical user interface (GUI) used by the client is comprised of a multi pane and multi control frame display. From the GUI the client can inspect the taxonomy or hierarchy tree in which the retrieved resources are organized. The GUI will also have panes where the resources stored in a branch/directory can be displayed, as well as, any other sub-branches/sub-directories that are organized under said branch. In addition, the GUI will have a series control implements where such routine maintenance functions can be initiated, including but not limited to, copying, moving, deleting, creating new branches/directories, creating new resources, refreshing the display, finalizing resources tagged for deletion, logging out, and requesting help. Those skilled in the art will be familiar with the multiple ways in which a hierarchy may be represented for computer use, such as linked lists and tables, and the typical functions used in managing such hierarchies.

Figure 10:
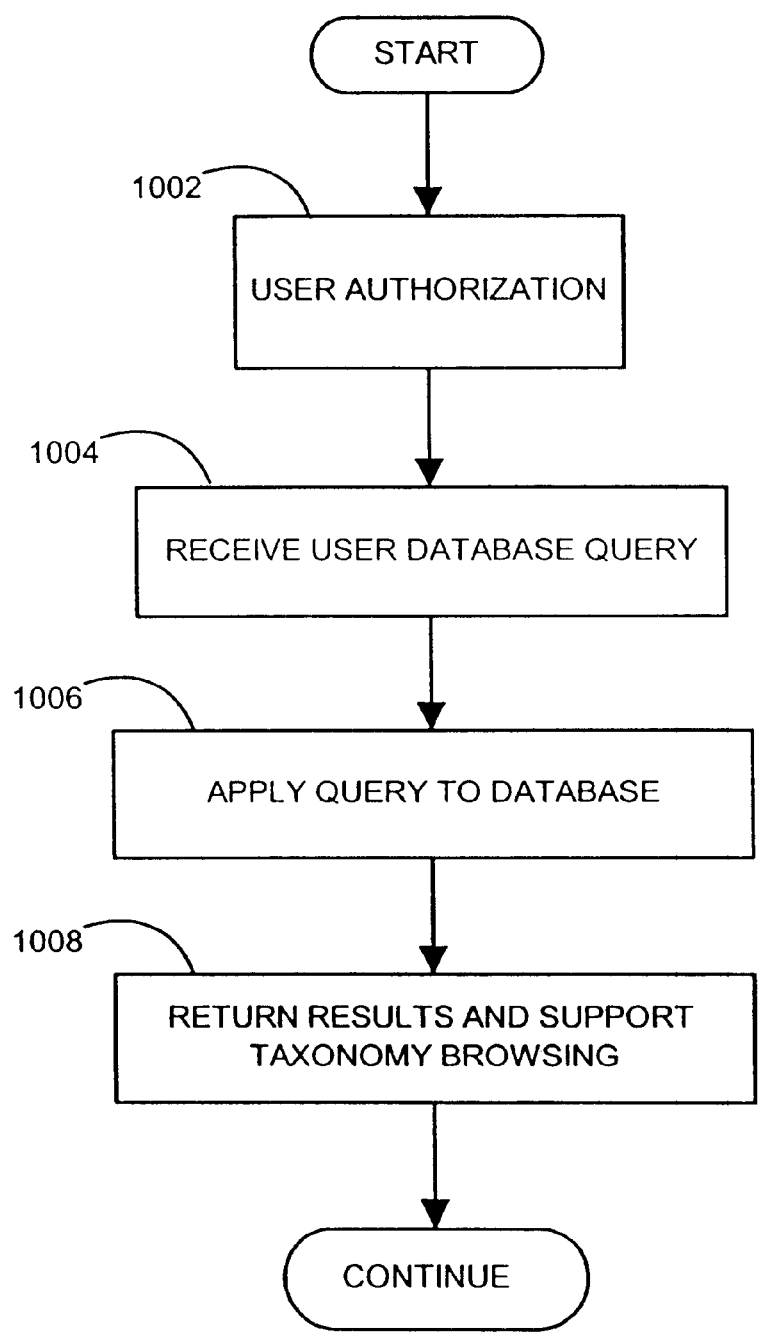
FIG. 10 is a flow diagram that illustrates the processing performed by the Front-End component for a user accessing an Database illustrated in FIG. 1.

FIG. 10 is a flow diagram that illustrates the processing performed by the Front-End component 108, where the Front-End component is one that is accessed by a user of the database. In the first processing operation, represented by the flow diagram box numbered 1002, the Front-End carries out a user authorization. This operation ensures proper data access security and recordation of financial charges, if any. Next, the Front-End receives a user database query at the flow diagram box numbered 1004. The Front-End then applies that query to the database, as indicated by the flow diagram box numbered 1006. Lastly, the Front-End returns the results to the user and may also permit user browsing of the taxonomy hierarchy. The browsing operation is especially useful to users who are not certain of how best to characterize the information being sought, and permits users to view the taxonomy hierarchy and travel among the different taxonomy categories. This processing is represented by the flow diagram box numbered 1008.

Figure 12:
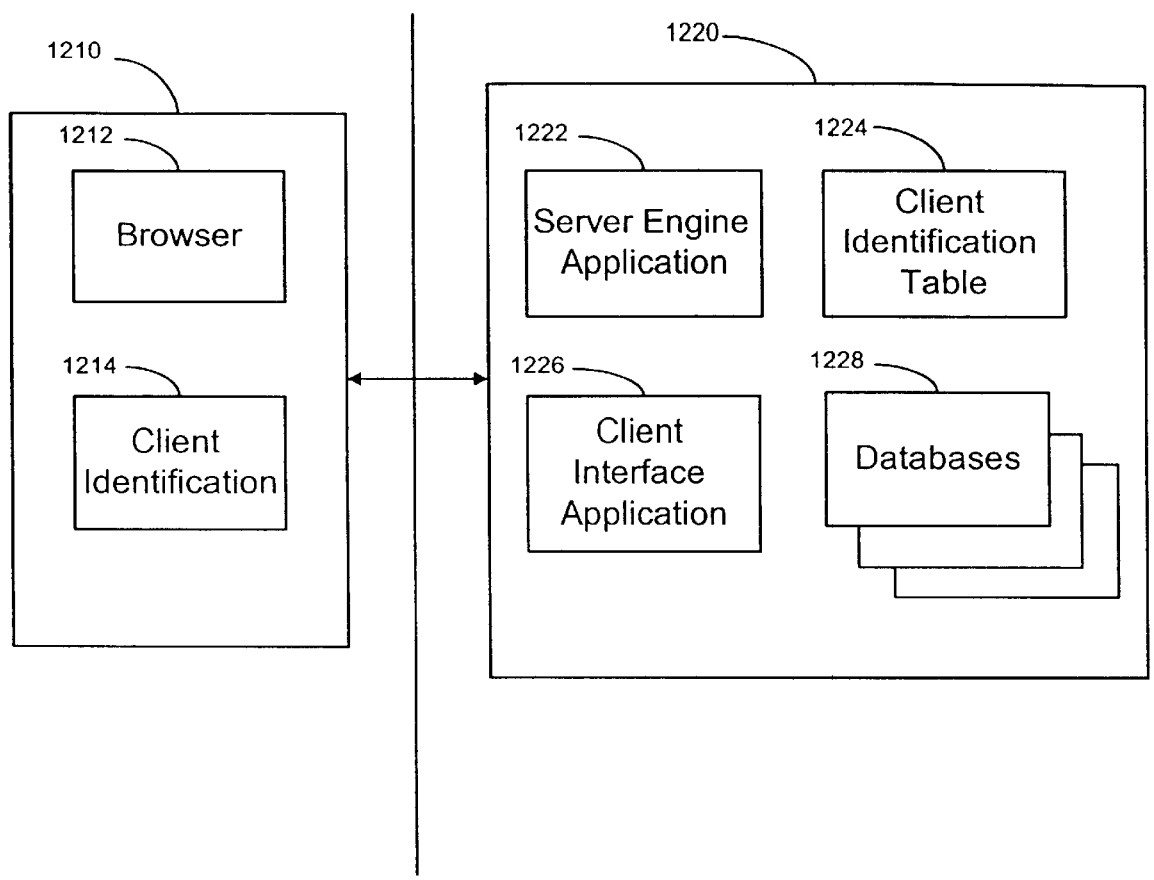
FIG. 12 is a block diagram that illustrates applications and files in the Front End and Back End components that enable management of client database files.

FIG. 12 is a block diagram illustrating an the applications and files of an embodiment of the present invention, which enables the client to manage a database over the Internet. As used in the present application, the term "management" refers to the processes and functions associated with organizing, revising and updating the objects that comprise the database, such as, resources (including, documents, web documents, and web pages), directories, and sub-directories, and the database itself. The processes and functions, include but are not limited to copying, moving, deleting, creating a new directory, creating a new resource, "Empty Trash", logging out, accessing help files, renaming resources, renaming directories, initiating a crawl for a new database, or initiating an existing crawl taxonomy for updating an existing database. Those of ordinary skill in the art would understand and appreciate the aforementioned functions and processes, and their application. In this embodiment, The Front End component 1210, which resides with the client, includes a browser application 1212, and a client identifier file 1214. Typically this is a file that resides in the client's computer, known as a "cookie", which contains information indicating that the computer accessing the Back End component is authorized to access and manage the client's databases. Alternatively, the Back End component may require the computer seeking access to transmit "user name" and "password" or like information to verify its identity and authorization. The Back End component 1220 includes a server engine application 1222, a client identifier table 1224, client interface application 1226, and a client database 1228. Those of skill in the art would appreciate that the databases can be organized as individual data structures, or a subset of data structures within a larger data structure without changing the operation of the present invention. The server engine application receives a requests and instructions from the client to access the client's databases. The server and client interact by exchanging information via communications link 1230, which may include transmission over the Internet. The Back End component verifies that the user is authorized to access the client's database, either through the client identifier file 1214, or by verification of user name and password.

Figure 13:
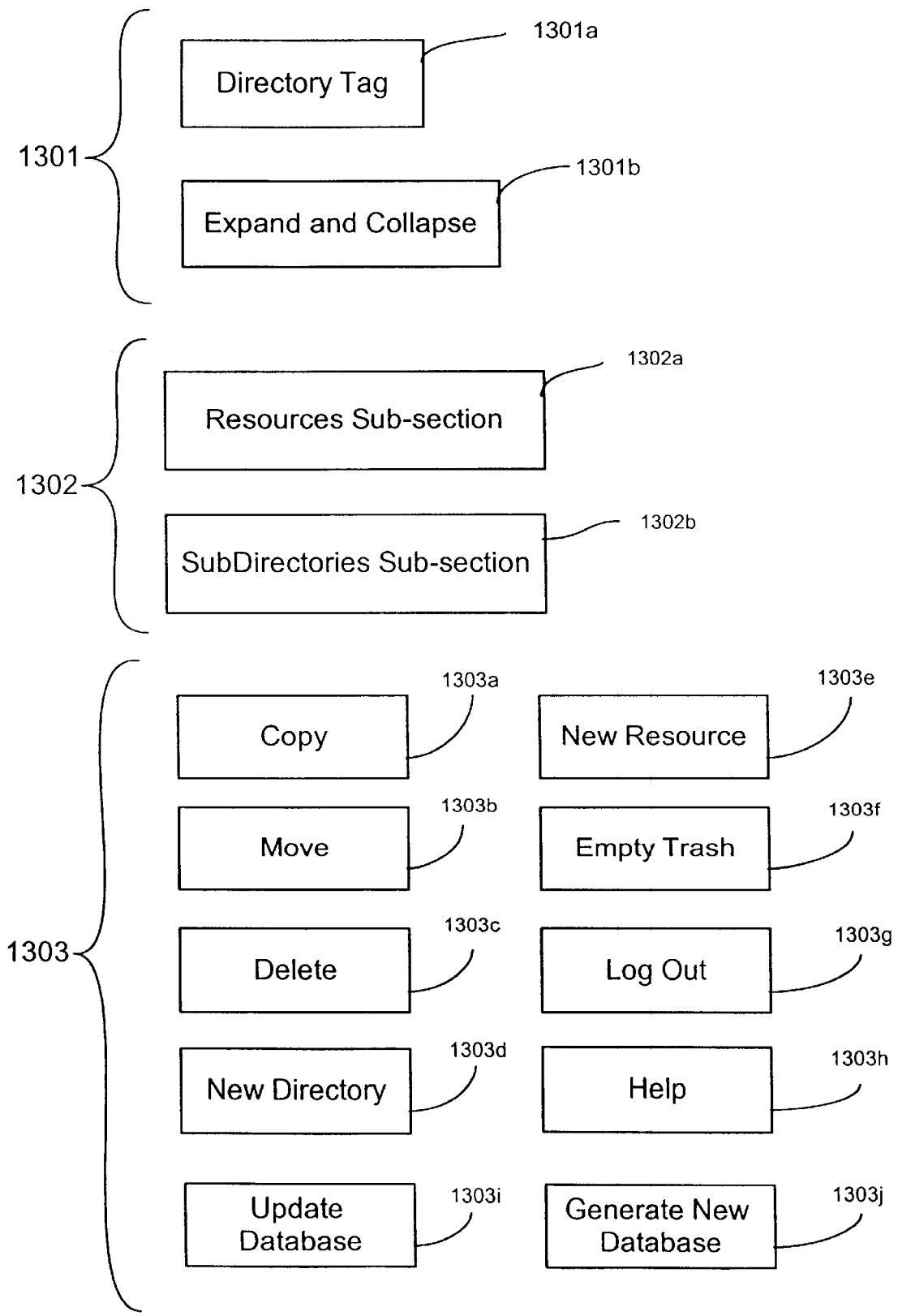
FIG. 13 is an example of a display from the Client Interface application, which shows taxonomy, and resource information from a client database.

FIG. 13 illustrates the Client Interface application of one embodiment of the invention, which displays the status and procedures that may be initiated by the client. This example display is sent from the server system 1222 to the client system 1210, and it displays the status and taxonomy of the client's database. The display illustrated in FIG. 13 contains a Taxonomy section 1301, a Resource section 1303, and a Control Bar section 1302. Those skilled in the art would appreciate that these various sections can be omitted or rearranged or adapted in various ways, while still maintaining their overall functionality. The Taxonomy section 1301 provides a graphical and textual representation of the taxonomy of the information contained in the database. The resources in the database are typically organized according to directories and sub-directories, which correspond to organizing the resources according to genus and sub-genus categories. Those of skill in the art would readily appreciate this type of organization regime, and the nomenclature associated with their use. Information gathered by the present invention can be automatically assigned to a taxonomy generated by the Classifier component of the present invention, as disclosed herein. Alternatively, the client can configure the invention so that certain types of resources, or all resources are manually ordered into a taxonomy by the client. The Taxonomy section provides a toggle box 1301*a*, which designates that an action is to be performed on the associated directory or sub-directory; and a toggle box 1301*b*, which toggles a specified directory to expand all of its sub-directories, or to collapse only to the parent directory. The Resource section 1302 provides detailed information regarding a specific directory. Within the Resource section is a sub-section 1302*a* for displaying detailed information relating to the resources that are classified in this directory, and a sub-section 1302*b* for displaying sub-directories that are associated with this directory. The Control bar section 1303 provides buttons that dictate and initiate actions that are to be performed on the directories, sub-directories or resources that have been tagged in the Taxonomy or Resource sections. In the present example, some of the actions that can be performed are copy 1303*a*, move 1303*b*, delete 1303*c*, new directory 1303*d*, new resource 1303*e*, empty trash 1303*f*, log out 1303*g*, help 1303*h*, updating an existing database 1303*i*, and generating a new database 1303*j*. Those of skill in the art would understand the operation of these functions and appreciate that any of these functions can be omitted or rearranged or adapted in various ways. Those of skill in the art would also understand that the functions are available or desirable for managing files and directories are not limited to those illustrated above.

Figure 14:
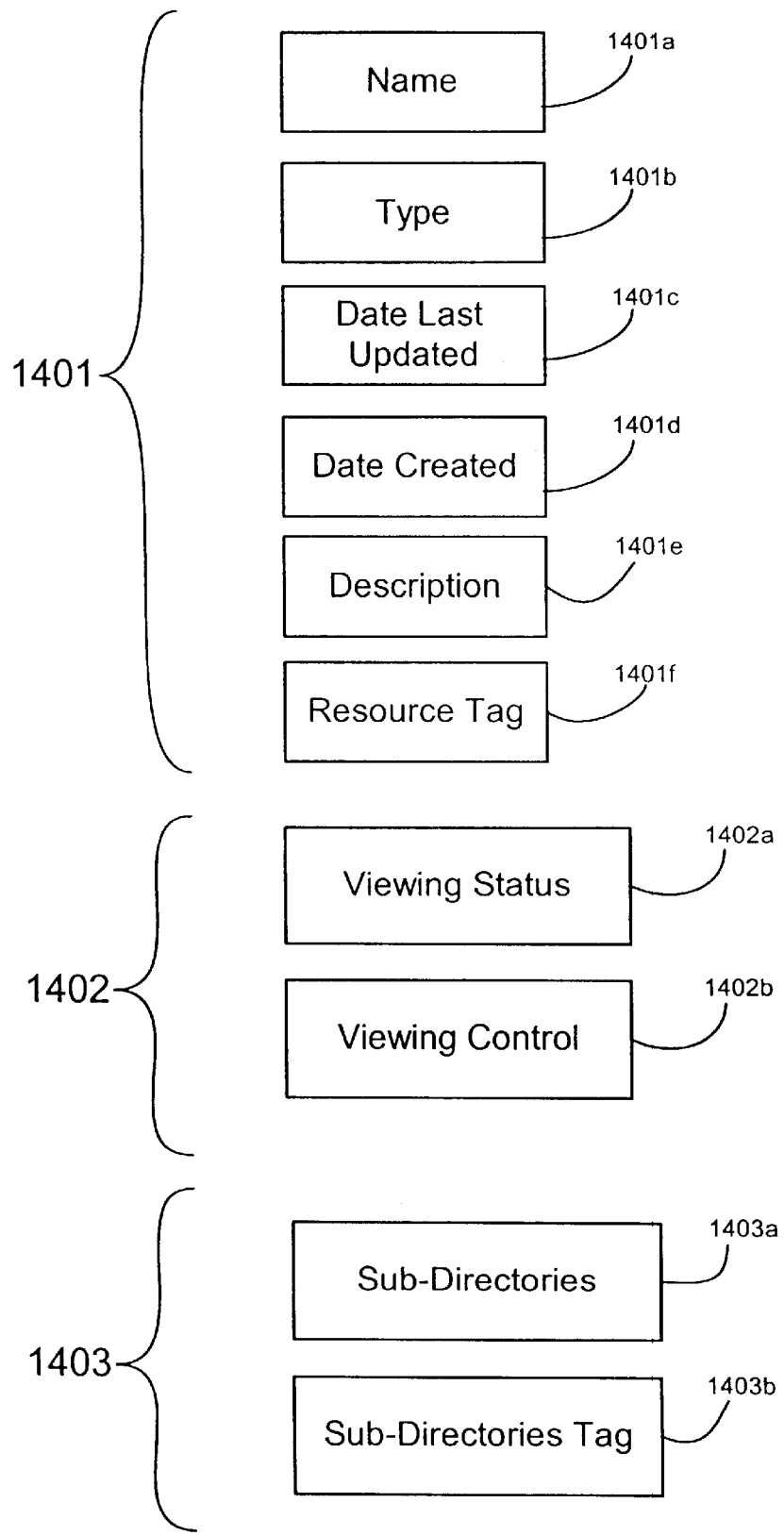
FIG. 14 is an example of a portion of the Client Interface application, which shows information about any specified directory and the resources that are classified within the directory.

FIG. 14 provides further illustration of the Resource section 1302 of the Client Interface Page 1226. When a directory is selected in the Taxonomy section 1301, the resources and sub-directories associated with this directory is displayed in the Resource section 1302. Resources are links on the Web that have been identified as of being relevant to the search criteria for the database. Each resource can have one or more properties that describe the data the resource contains. The Resource section displays and manages this information for the client. The Resource section can have three sub-sections, Resources 1401, Viewing information and Control 1402, and Sub-directories 1403. The Resources sub-section 1401 displays information about the properties of the resource in a tabular form with the individual resources listed as rows and properties, such as, the resource's name 1401*a*, type 1401*b*, date last updated 1401*c*, date created 1401*d*, and a description 1401*e*, as columns. The display provides for the sorting of the resources in ascending or descending order according to the various properties by clicking on the column header of the desired property. Each resource has an associated toggle box 1401*f*, which can be toggled to indicate that a specific action is to be performed on the resource. The Viewing and Control sub-section 1402 displays information regarding the number of resources being displayed in the Resources sub-section 1402*a*. For example, the View portion can display the current number of resources being viewed out of the total number available. The Viewing and Control sub-section 1402 also provides control boxes 1402*b* for setting the number of resources displayed. The Sub-directories sub-section 1403 displays any sub-directories 1403*a* that are associated with the directory being viewed. Each sub-directory has an associated toggle box 1403*b*, which can be toggled to indicate that a specific action is to be performed on the sub-directory.

It is evident to those skilled in the art, the present invention provides an advantageous method of permitting a secondary service provider the ability to review and organize the retrieved resources and to refine the search parameters used by the Spider for updating the database, thereby improving the efficiency of the Spider without the intervention of the primary service provider.

Further the present invention, provides a method for a primary service provider to provide database services at improved efficiencies. For example, the method of updating the retrieval priority list during the course of a crawl results in the Spider at any given point always retrieving the most relevant documents, versus, automatically retrieving all the links regardless of relevancy; resulting in a higher ratio of relevant resources retrieved to overall number of resources retrieved. This provides the primary service provider with a better product to its client. This is also accomplished using minimal computer time/resources, which provides in increased economy and efficiency to the primary service provider. In addition, the present invention permits the client/secondary service provider to review and revise the results of a crawl without the need for human intervention from the primary service provider; and thereby providing additional instances of economy to the primary service provider.

Thus, the system described above provides an efficient technique for indexing web pages and creating an database that will provide more relevant search results and more efficient operation. These efficiencies are obtained through specialized components, such as the Spider, Harvester and Classifier described above.

The present invention has been described above in terms of a presently preferred embodiment so that an understanding of the present invention can be conveyed.

There are, however, many configuration for HTML document retrieval and indexing systems not specifically described herein but with which the present invention is applicable. The present invention should therefore not be seen as limited to the particular embodiments described herein, but rather, it should be understood that the present invention has wide applicability with respect to HTML document retrieval and indexing systems generally. All modifications, variations, or equivalent arrangements and implementations that are within the scope of the attached claims should therefore be considered within the scope of the invention.

We claim:

1. An automated method of creating or updating a database of resumes and related documents from a network of documents, said method comprising, a) entering at least one example document that is relevant to a subject taxonomy in a retrieval priority list, if there is a plurality of example documents stored in said retrieval priority list, ranking said example documents according to the relevancy of said example documents to said subject taxonomy;

b) retrieving a document from a network of documents, where said document is the most relevant document to said subject taxonomy stored in said retrieval priority list;

c) harvesting information from specified fields of said document;

d) classifying said information into one or more classes according to specified categories of said subject taxonomy;

e) storing said information into a database;

f) determining whether said information are links to other documents;

g) ranking said link's according to relevancy to said subject taxonomy, and storing said links in said retrieval priority list according to said relevancy;

h) terminating said method, provided said method's stop criteria have been met; and i) repeating steps b) through h), provided said method's stop criteria has not been met.

2. The method of claim 1, wherein in step c) said specified fields is according to a Harvester Content Type Model.

3. The method of claim 1, wherein in step d) said specified categories is according to a Classifier Content Type Model.

4. The method of claim 1, wherein in step g) said link's relevancy is determined according to said Classifier Content Type Model.

5. The method of claim 1, wherein in step g) said link's relevancy is determined according to a Directed Graph Cluster Module.

6. The method of claim 1 further comprising:
   a) receiving a topic;
   b) applying the topic to the subject taxonomy of the database.

7. A computer system for creating or updating a database of resumes and related documents, said computer system comprising:
   a central processing unit that can establish communication with a network of documents; and
   a program memory that stores programming instructions executed by said central processing unit, wherein said computer system executing said programming instructions performs a process comprising,
      a) entering at least one example document that is relevant to a subject taxonomy in a retrieval priority list, it there is a plurality of example documents stored in said retrieval priority list, ranking said example documents according to the relevancy of said example documents to said subject taxonomy;
      b) retrieving a document from a network of documents, where said document is the most relevant document to said subject taxonomy stored in said retrieval priority list;
      c) harvesting information from specified fields of said document;
      d) classifying said information into one or more classes according to specified categories of said subject taxonomy;
      e) storing said information into a database;
      f) determining whether said information are links to other documents;
      g) ranking said link's according to relevancy to said subject taxonomy, and storing said links in said retrieval priority list according to said relevancy;
      h) terminating said method, provided said method's stop criteria have been met; and
      i) repeating steps d) through j), provided said method's stop criteria has not been met.

8. A computer-readable medium having computer-executable instructions for performing a method comprising:
   a) entering at least one example document that is relevant to a subject taxonomy in a retrieval priority list, it there is a plurality of example documents stored in said retrieval priority list, ranking said example documents according to the relevancy of said example documents to said subject taxonomy;
   b) retrieving a document from a network of documents, where said document is the most relevant document to said subject taxonomy stored in said retrieval priority list;
   c) harvesting information from specified fields of said document;
   d) classifying said information into one or more classes according to specified categories of said subject taxonomy;
   e) storing said information into a database;
   f) determining whether said information are links to other documents;
   g) ranking said link's according to relevancy to said subject taxonomy, and storing said links in said retrieval priority list according to said relevancy;
   h) terminating said method, provided said method's stop criteria have been met; and
   i) repeating steps b) through h), provided said method's stop criteria has not been met.

9. An automated method of creating or updating a database of resumes and related documents, said method comprising:
   a) training a spider to retrieve relevant documents from example documents within a retrieval priority list and ranking said example documents according to the relevancy of said example documents to subject taxonomy from a network of documents;
   b) retrieving said relevant documents from said network of documents;
   c) extracting information from said retrieved relevant documents;
   d) classifying said extracted information;
   e) storing said extracted information into a database;
   f) determining whether said information are links to other documents;
   g) ranking said links according to relevancy to said taxonomy, and storing said links in said retrieval priority list according to said relevancy;
   h) terminating said method, provided that said method's stop criteria have been met; and
   i) repeating steps b) through h), provided said method's stop criteria has not been met.

10. A database of resumes and related documents created from a method comprising:
   a) training a spider to retrieve relevant documents from example documents within a retrieval priority list and ranking said example documents according to the relevancy of said example documents to subject taxonomy from a network of documents;
   b) retrieving said relevant documents from said network of documents;
   c) extracting information from said retrieved relevant documents;
   d) classifying said extracted information;
   e) storing said extracted information into a database;
   f) determining whether said information are links to other documents;
   g) ranking said links according to relevancy to said taxonomy, and storing said links in said retrieval priority list according to said relevancy;
   h) terminating said method, provided that said method's stop criteria have been met; and
   i) repeating steps b) through h), provided said method's stop criteria has not been met.

* * * * *